United States Patent [19]
Motoyama

[11] Patent Number: 5,887,216
[45] Date of Patent: Mar. 23, 1999

[54] METHOD AND SYSTEM TO DIAGNOS A BUSINESS OFFICE DEVICE BASED ON OPERATING PARAMETERS SET BY A USER

[75] Inventor: Tetsuro Motoyama, Cupertino, Calif.

[73] Assignees: Ricoh Company, Ltd., Tokyo, Japan; Ricoh Corporation, San Jose, Calif.

[21] Appl. No.: 820,633

[22] Filed: Mar. 19, 1997

[51] Int. Cl.[6] .................................................. G03G 15/00
[52] U.S. Cl. .................................. 399/8; 395/114; 399/9; 399/43
[58] Field of Search .............................. 399/8, 9, 11, 43, 399/49, 10; 395/184.01, 183.01, 114; 364/921.8, 927.96, 940.61, 940, 940.62, 943.9

[56] References Cited

U.S. PATENT DOCUMENTS

| | | | |
|---|---|---|---|
| 4,845,658 | 7/1989 | Gifford | 364/940 X |
| 5,053,815 | 10/1991 | Wendell | 399/10 |
| 5,175,585 | 12/1992 | Matsubayashi et al. | 399/49 |
| 5,214,772 | 5/1993 | Weinberger et al. | 395/184.01 |
| 5,317,368 | 5/1994 | Shimomura et al. | 399/12 |
| 5,333,037 | 7/1994 | Inoue et al. | 399/49 |
| 5,386,271 | 1/1995 | Maekawa et al. | 399/8 |
| 5,386,276 | 1/1995 | Swales et al. | 399/8 |
| 5,475,476 | 12/1995 | Murai et al. | 399/29 |
| 5,512,979 | 4/1996 | Ogura | 399/8 |
| 5,594,529 | 1/1997 | Yamashita et al. | 399/8 |
| 5,600,403 | 2/1997 | Inoo | 399/8 |
| 5,764,918 | 6/1998 | Poulter | 395/114 X |

*Primary Examiner*—Arthur T. Grimley
*Assistant Examiner*—Sophia S. Chen
*Attorney, Agent, or Firm*—Oblon, Spivak, McClelland, Maier & Neustadt, P.C.

[57] ABSTRACT

A method and system for determining that problems exist in a business office device such as a copier, printer, facsimile machine, or scanner by analyzing the user settings of the business office device. If the user settings deviate from the default settings by a predetermined amount, there is a probability that the default settings are improper, parameters need to be changed within the business office device, or defective components within the business office device need to be changed. The analysis of the user settings is triggered after a predetermined time period expires, after a predetermined number of jobs are performed, or alternatively after a predetermined combination of jobs and elapsed time occurs. After a problem is found to exist with the default settings, the business office device communicates with a diagnostic service center via a connectionless-mode of communication such as by an Internet electronic mail message. If the diagnostic service center can not remotely correct the problem in the business office device, the diagnostic service center indicates that a service call is to be made.

68 Claims, 13 Drawing Sheets

| ID | MODEL | SERIAL # | COMMAND LEVEL | ADDRESS |
|---|---|---|---|---|
| 440↗ 442↑ | 444↑ | 446↑ | 448↑ | 450↑ |
| | | | | |

*FIG. 9A*

| ID | ATTACHMENT ID | ATTACHMENT SERIAL # | |
|---|---|---|---|
| 460↗ 462↑ | 464↑ | 466↑ | |
| | | | |

*FIG. 9B*

| ID | DATE/TIME | INFORMATION | |
|---|---|---|---|
| 470↗ 472↑ | 474↑ | 476↑ | |
| | | | |

*FIG. 9C*

METHOD AND SYSTEM TO DIAGNOS A BUSINESS OFFICE DEVICE BASED ON OPERATING PARAMETERS SET BY A USER

CROSS-REFERENCES TO RELATED APPLICATIONS

The present application is related to U.S. patent application Ser. No. 08/733,134 filed Oct. 16, 1996 entitled "Method and System for Diagnosis and Control of Machines Using Connectionless Modes of Communication", U.S. patent application Ser. No. 08/624,228 filed Mar. 29, 1996, now U.S. Pat. No. 5,818,603, entitled "Method and System for Controlling and Communicating with Machines Using Multiple Communication Formats", U.S. patent applications Ser. No. 08/738,461 and 08/738,659 each filed Oct. 30, 1996 and entitled "Method and System for Diagnosis and Control of Machines Using Connection and Connectionless Modes of Communication" which are divisional applications of U.S. patent application Ser. No. 08/463,002 filed Jun. 5, 1995, now U.S. Pat. No. 5,819,110, entitled "Method and System for Diagnosis and Control of Machines Using Connection and Connectionless Modes of Communication", and U.S. patent application Ser. No. 08/698,068 filed Aug. 15, 1996, now U.S. Pat. No. 5,649,120, entitled "Method and Apparatus for Controlling and Communicating With Business Office Devices", which is a continuation of U.S. patent application Ser. No. 08/562,192 filed Nov. 22, 1995, now U.S. Pat. No. 5,568,618, which is a continuation of U.S. patent application Ser. No. 08/473,780 filed Jun. 6, 1995, entitled "Method and Apparatus for Controlling and Communicating With Business Office Devices", now U.S. Pat. No. 5,544,289, which is a continuation of U.S. patent application Ser. No. 08/426,679 filed Apr. 24, 1995, now U.S. Pat. No. 5,537,554, entitled "Method and Apparatus for Controlling and Communicating With Business Office Devices" which is a continuation of U.S. patent application Ser. No. 08/282,168 filed Jul. 28, 1994 and entitled "Method and Apparatus for Controlling and Communicating With Business Office Devices", now U.S. Pat. No. 5,412,779, which is a continuation of U.S. patent application Ser. No. 07/902,462 filed Jun. 19, 1992, now abandoned, which is a continuation of U.S. patent application Ser. No. 07/549,278, filed Jul. 6, 1990, now abandoned, the disclosure of each is incorporated herein by reference.

BACKGROUND OF THE INVENTION

1. Field of the Invention

This invention is related to the diagnosing of a business office device such as a printer, facsimile machine, scanner, or copier which determines an abnormal condition therein based on an operating parameter set by a user which controls the operation of the business office device. The invention is more particularly related to analyzing the user setting of the print density (e.g., darker or lighter) in order to determine if a printing operation is being performed correctly. The invention is still further related to the communication between a diagnostic service center and the business office device which is performed in order to complete the diagnostic process or to call a local service center to have the business office device repaired.

2. Discussion of the Background

The monitoring of faults in business office devices such as facsimile machines, printers, scanners, or copiers is well-known. An important operating parameter of a print forming device such as a printer, facsimile machine, or copier is the image density of printed images which is closely monitored and controlled in order to assure high quality prints from the copier. There are various known ways to monitor or adjust the print density, such as by monitoring the toner concentration, as disclosed in U.S. Pat. No. 5,475,476 to Murai. Further, other techniques for monitoring and controlling image density are disclosed in U.S. Pat. Nos. 5,175,585, 5,333,037, and 5,317,368. A feature of the above patents is the monitoring of print density by forming a toner pattern and evaluating, using a sensor, the resulting density of the toner pattern. Each of the above related art patents are incorporated herein by reference.

In addition to monitoring the various operating parameters of a copier, it is also known to monitor the occurrence of occasional faults in a copier to statistically predict when the failure of a part will occur. Such a monitoring of problems and performing a statistical analysis to determine a probability of component failure is disclosed in U.S. Pat. No. 5,053,815.

However, the present inventor has recognized that the conventional fault monitoring systems input their data through electrical or electrical-mechanical sensors and are only as accurate as the accuracy of the sensors. Further, conditions which the diagnostic software determines to be acceptable might not be acceptable to the majority of the users.

SUMMARY OF THE INVENTION

Accordingly, it is an object of this invention is to monitor the actions of the user of the device in order to determine if the business office device is operating properly.

It is a further object of the invention to monitor the user parameters over a predetermined number of jobs and/or a predetermined time duration in order to determine if the business office device is operating properly.

It is yet another object of the invention to communicate an indication of a problem in the business office device to a diagnostic service center, preferably by a connectionless-mode of communication.

These and other objects are accomplished by a method and system for analyzing how a user interacts with a business office device such as a copier, digital copier, printer, facsimile machine or scanner. Each time the business office device is operated, the user selected parameters of the business office device are monitored. After a predetermined time duration and/or a predetermined number of jobs performed by the business office device, the various user settings or other indications as to how the user operates the business office device are evaluated in order to determined if there is an abnormal condition in the business office device. If an abnormal condition is detected in the business office device, the business office device may attempt to correct the abnormal condition itself, or alternatively, communicate with a diagnostic service center.

The manner in which the business office device is used may change depending on the nature of the job being performed and therefore, it is desirable to analyze the user settings over a predetermined period of time. The settings may be statistically analyzed by looking at features such as the average value of a parameter setting, standard deviation, or a number of times a feature of the business office device was used.

An advantage of the present invention is that it is the user settings which are being monitored and the user settings indicate what is most desirable to a user. For example, it is possible that in a conventional system which automatically determines and controls density, the optical sensor which monitors density is not functioning properly and therefore, the entire system for detecting print density is not working properly. However, as the present invention monitors one or more parameters or functions set by a user, if the users consistently select a darker print density, it probably means that the default setting of the print density is not dark enough and should be adjusted. While it may be clear to a user that the output density may have a problem and the user can easily correct this problem by the print density setting, the automatic print density detection systems themselves may not always detect that print jobs are being improperly generated.

Communication with a diagnostic service center can be used to indicate a problem. Such communication can be performed using a connectionless-mode of communication such as an Internet electronic mail message, or alternatively, a connection-mode of communication. The diagnostic service center may attempt to correct any problems which exist with the business office device by performing remote diagnostic and corrective procedures. If it is not possible for the problem to be corrected remotely, the diagnostic service center can instruct a service call to be performed in order for the problem to be corrected manually during a service call.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9A illustrates the main components of the service data base;

FIG. 9B illustrates information of an attachment and options data base;

FIG. 9C illustrates a data base used for keeping track of the history of various machines;

DESCRIPTION OF THE PREFERRED EMBODIMENTS

Figure 1:
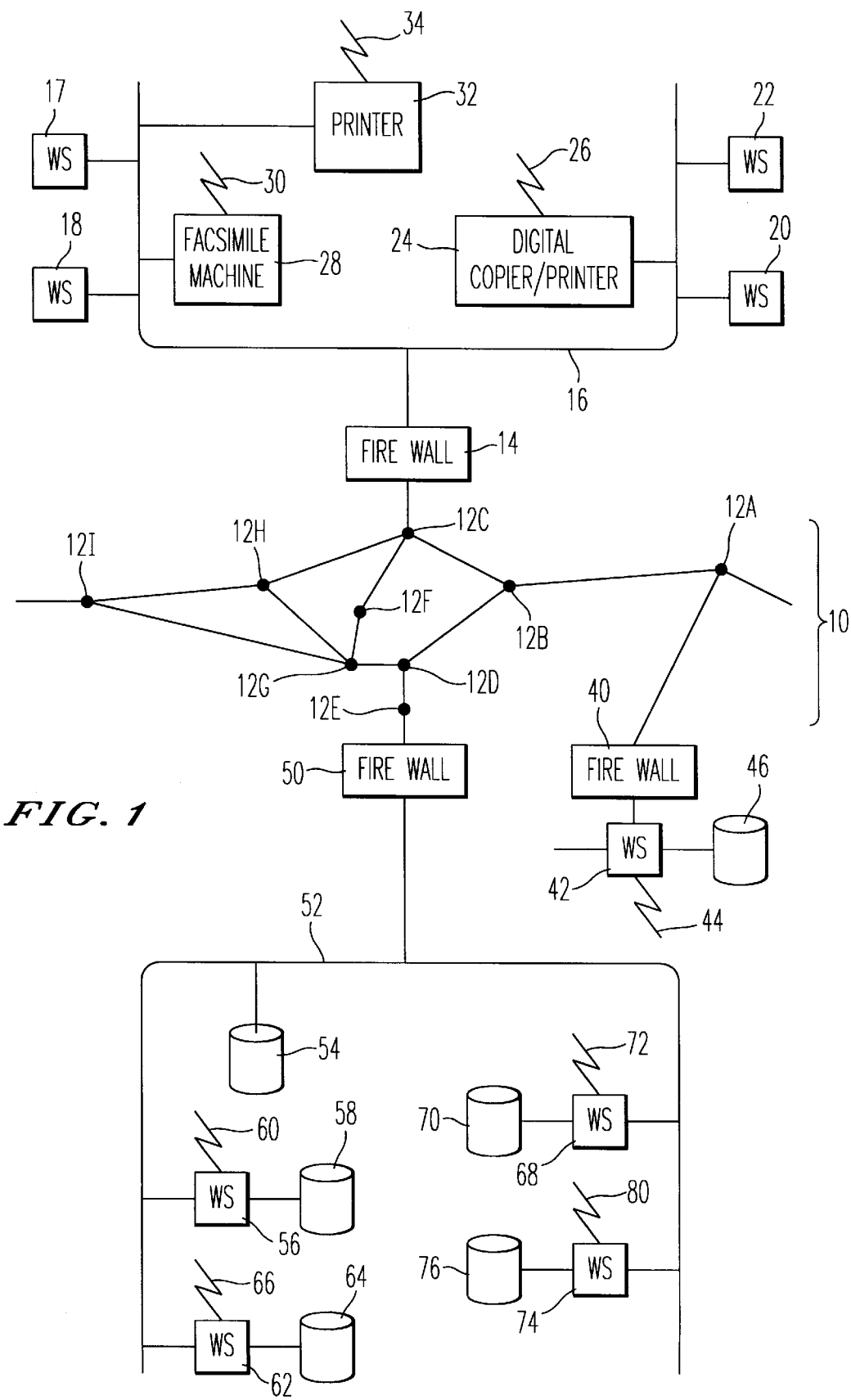
FIG. 1 illustrates three networked business office machines connected to a network of computers and data bases through the Internet.

Referring now to the drawings, wherein like numerals designate identical or corresponding parts throughout the several views, and more particularly to FIG. 1 thereof, there is illustrated a figure showing various machines and computers for monitoring, diagnosing and controlling the operation of the machines. In FIG. 1, there is a first network 16, such as a Local Area Network (LAN) connected to computer workstations 17, 18, 20 and 22. The workstations can be any type of computers including IBM Personal Computer compatible devices, Unix Based Computers, or Apple Macintoshes. Also connected to the network 16 are a digital copier/printer 24, a facsimile machine 28, and a printer 32. The devices 24, 28 and 32 are referred to as machines or monitored devices although other types of devices may be used as the machines or monitored devices. Also, a facsimile server (not illustrated) may be connected to the network 16 and have a telephone or ISDN connection. In addition to the digital copier/printer 24, facsimile machine 28, and printer 32 being connected to the network 16, these devices may also include conventional telephone and/or ISDN connections 26, 30 and 34, respectively. As is explained below, the business office machines or business devices 24, 28 and 32 communicate with a remote monitoring, diagnosis and control station, also referred to as a monitoring device, through the Internet via the network 16 or by a direct telephone or ISDN connection.

In FIG. 1, the Internet is generally designated by 10. The Internet 10 includes a plurality of interconnected computers and routers designated by 12A–12I. The manner of communicating over the Internet is known through RFC documents obtained by FTP at NIC.DDN.MIL or at FTP NISC-.SRI.COM. TCP/IP related communication is described for example in the book "TCP/IP Illustrated," Vol. 1, The Protocols, by Stevens, from Addison-Wesley Publishing Company, 1994. As the Internet is a network accessible by many people and organizations, it is not considered to be secure. Therefore, messages transmitted over the Internet should be encrypted to keep the messages confidential. Encryption mechanisms are known and commercially available which may be used with the present invention. For example, a C library function, crypt(), is available from Sun Microcomputers for use with the Unix operating system, and other encryption and decryption routines are known and commercially available.

An additional security measure used in connecting a computer network to the Internet is a protective device known as a firewall. This device allows only authorized computers to access a network or other computer via the Internet. Firewalls are known and commercially available devices and, for example, include SunScreen from Sun Microsystems Inc.

In FIG. 1, a firewall 14 is connected between the Internet 10 and the network 16. Similarly, a firewall 50 is connected between the Internet 10 and a network 52. Also, a firewall 40 is connected between the Internet 10 and a workstation 42.

The network 52 is a conventional network and includes a plurality of workstations 56, 62, 68 and 74. These workstations may be different departments within a company such as a marketing, manufacturing, design engineering and customer service departments. In addition to the workstations connected via the network 52, there is a workstation 42 which is not directly connected to the network 52. Information in a data base stored in a disk 46 may be shared using proper encryption and protocols over the Internet to the workstations connected directly to the network 52. Also, the workstation 42 includes a direct connection to a telephone line and/or ISDN 44 and the data base in disk 46 may be accessed through the telephone line or ISDN.

Information of the business office machines 24, 28 and 32 may be stored in one or more of the data bases stored in the disks 46, 54, 58, 64, 70 and 76. Each of the customer service, marketing, manufacturing, and engineering departments may have their own data base or may share from one or more data bases. Each of the disks used to store data bases is a non-volatile memory such as a hard disk or optical disk. As an example, disk 64 contains the marketing data base, disk 58 contains the manufacturing data base, disk 70 contains the engineering data base and disk 76 contains the customer service data base. Alternatively, the disks 54 and 46 store one or more of the data bases.

In addition to the workstations 56, 62, 68, 74 and 42 being connected to the Internet, these workstations may also include a connection to a telephone line or ISDN 60, 66, 72, 80, and 44, respectively which provides a secure connection to the machine being monitored diagnosed and/or controlled and is used during a connection-mode of communication. Further, the connection-mode of communication includes world wide web communications on the Internet. Additionally, if one of the Internet, and telephone or ISDN is not operating properly, the other can be automatically used for communication.

A feature of the present invention is the use of a connectionless-mode of communication or transmission between a machine and a computer for diagnosing and controlling the machine. The IBM Dictionary of Computing by George McDaniel, 1994, defines a connectionless-mode transmission to be the transmission of a single unit of data from a source service access point to one or more destination service access points without establishing a connection. The IBM Dictionary also defines a connection-mode transmission to be the transmission of units of data from a source service access point to one or more destination service access points via a connection. The connection is established prior to data transfer and released following data transfer. Additional information about the connection-mode and the connectionless-mode of operation is described in the Handbook of Computer-Communications Standards, Vol. 1, 2nd Edition, by William Stallings, 1990, which is incorporated herein by reference. Stallings indicates that in order to transfer data from one DTE (Data Terminal Equipment) to another DTE, there is a unique identifier or address for each DTE. The unique identifier or address is usable in both connection and connectionless-modes of communication.

Any type of a connectionless-mode of communication may be used by the present invention. An inexpensive and readily available medium through which connectionless messages may pass is the Internet processing electronic mail messages. The connectionless input and output processes may be according to any known Internet e-mail protocol such as used by the BSD Unix mail system which is incorporated into the SunOS 4.1.X. Also, other information describing Internet e-mail operations are readily available through various sources on the Internet itself. The e-mail message which is transmitted will include the address or identifier of the receiving entity and also the address of identifier of the transmitting entity While the Internet provides an inexpensive manner of a connectionless-mode of communication, the Internet electronic mail system may be slow or unreliable and therefore, in certain circumstances, instead of using a connectionless process, a direct connection process as described below, is performed.

Figure 2:
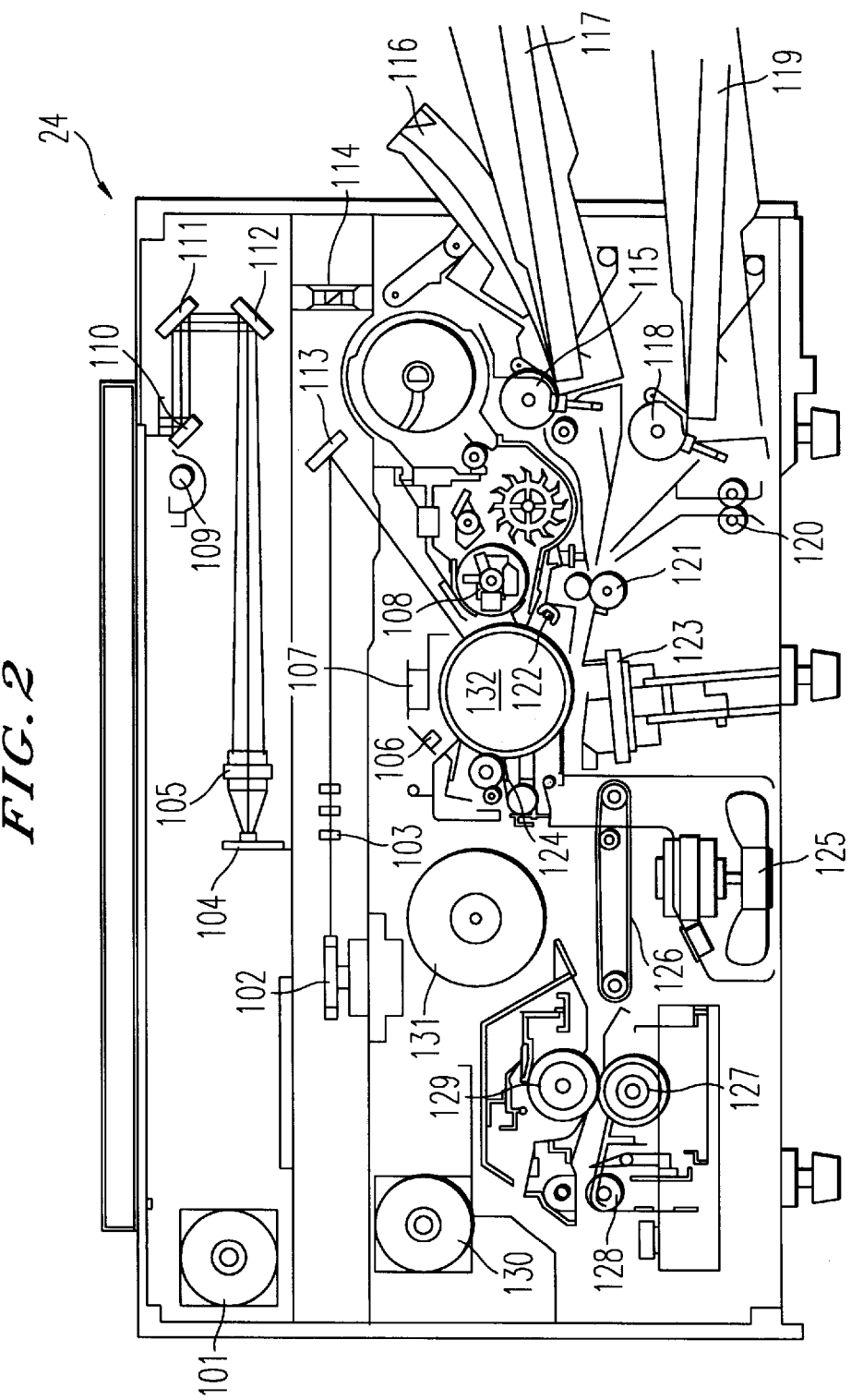
FIG. 2 illustrates the components of a digital copier/printer.

FIG. 2 illustrates the mechanical layout of the digital copier/printer 24 illustrated in FIG. 1. In FIG. 2, 101 is a fan for the scanner, 102 is a polygonal mirror used with a laser printer, and 103 designates an Fθ lens used to collimate light from a laser (not illustrated). Reference numeral 104 designates a sensor for detecting light from the scanner, 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illustrate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital copier/printer, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier. If desired, a sensor to sense the density of a test image on the photoconductive drum 132 may be used.

Figure 3:
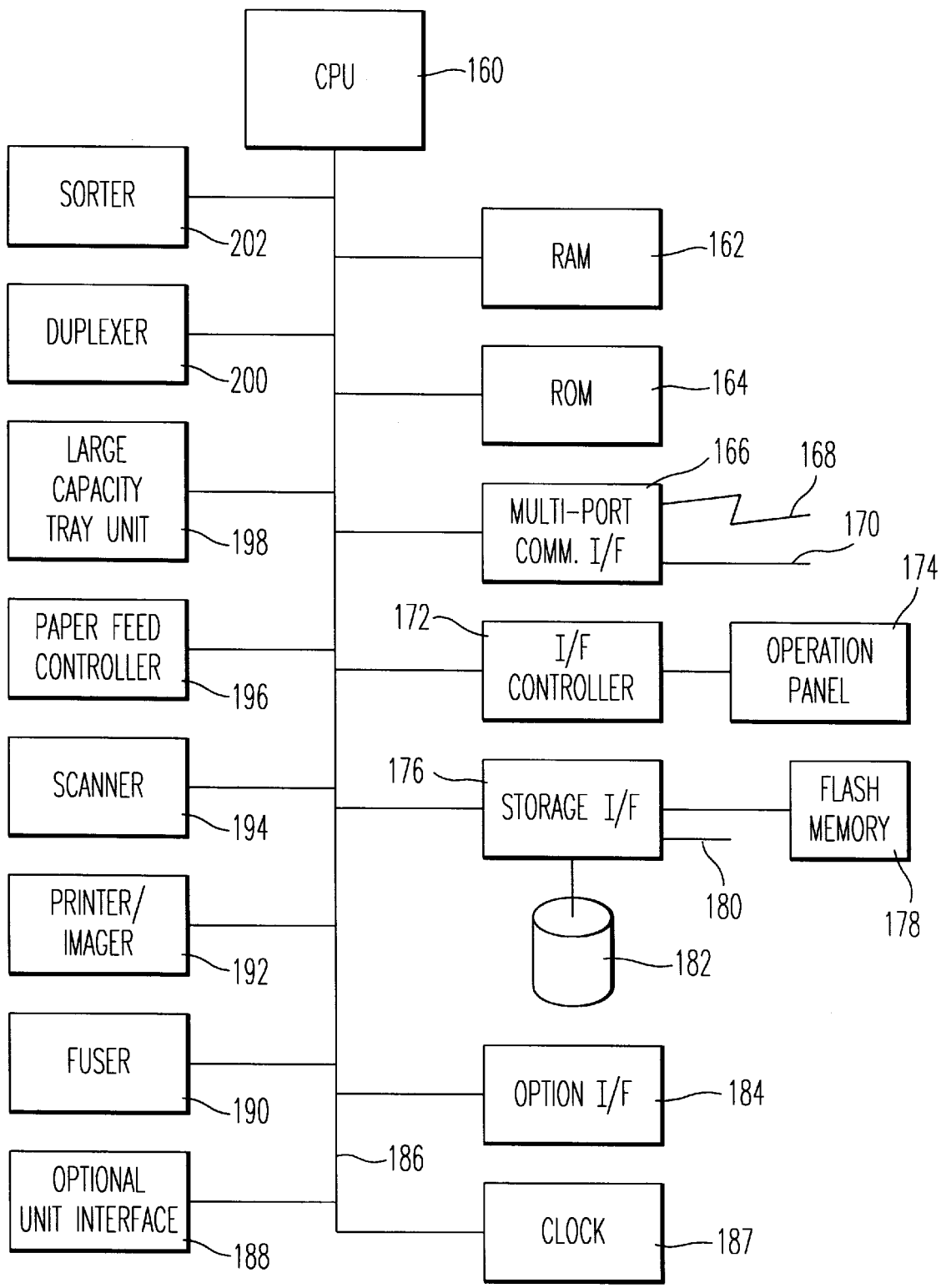
FIG. 3 illustrates electronic components of the digital copier/printer illustrated in FIG. 2.

FIG. 3 illustrates a block diagram of the electronic components illustrated in FIG. 2. The CPU 160 is a microprocessor and acts as the system controller. There is a random access memory 162 to store dynamically changing information including operating parameters of the digital copier. A read only memory 164 stores the program code used to run the digital copier and also information describing the copier (static-state data) such as the model number and serial number of the copier.

There is a multi-port communication interface 166 which allows the digital copier to communicate with external devices. Reference numeral 168 represents a telephone or ISDN line and 170 represents a network. Further information of the multi-port communication interface is described with respect to FIG. 4. An interface controller 172 is used to connect an operation panel 174 to a system bus 186. The operation panel 174 includes standard input and output devices found on a copier such as a digital copier. Details of the operation panel 174 are explained below with respect to FIG. 5.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital copier. The flash memory 178 is used to store semi-static state data which describes parameters of the digital copier which infrequently change over the life of the copier. Such parameters include the options and configuration of the digital copier. An option interface 184 allows additional hardware such as an external interface to be connected to the digital copier. There is a clock 187 which is used to keep track of time and performs the functions of a timer. The clock 187 may also be used to control the synchronization of the components illustrated in FIG. 3.

On the left side of FIG. 3, the various sections making up the digital copier are illustrated. Reference numeral 202 designates a sorter and contains sensors and actuators used to sort the output of the digital copier. There is a duplexer 200 which allows a duplex operation to be performed by the digital copier and includes conventional sensors and actuators. The digital copier includes a large capacity tray unit 198 which allows paper trays holding a large number of sheets to be used with the digital copier. The large capacity tray unit 198 includes conventional sensors and actuators.

A paper feed controller 196 is used to control the operation of feeding paper into and through the digital copier. A scanner 194 is used to scan images into the digital copier and includes conventional scanning elements such as a light, mirror, etc. Additionally, scanner sensors are used such as a home position sensor to determine that the scanner is in the home position and a lamp thermistor to ensure proper operation of the scanning lamp. There is a printer/imager 192 which prints the output of the digital copier and includes a conventional laser printing mechanism, a toner sensor, and an image density sensor. A fuser 190 is used to fuse the toner onto the page using a high temperature roller and includes an exit sensor, a thermistor to assure that the fuser is not overheating, and an oil sensor. Additionally, there is an optional unit interface 188 used to connect to optional elements of the digital copier such as an automatic document feeder, a different type of sorter/collator, or other elements which can be added to the digital copier.

Figure 4:
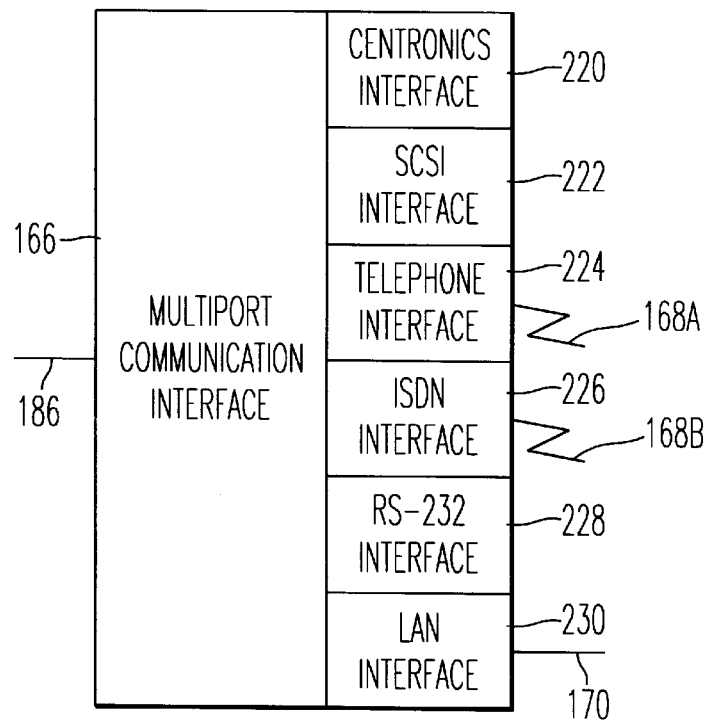
FIG. 4 illustrates details of the multi-port communication interface illustrated in FIG. 3.

FIG. 4 illustrates details of the multi-port communication interface 166. The digital copier may communicate to external devices through a Centronics interface 220 which receives or transmits information to be printed, a SCSI (small Computer System Interface) interface 222, a conventional telephone interface 224 which connects to a telephone line 168A, an ISDN interface 226 which connects to an ISDN line 168B, an RS-232 interface 228, and a LAN interface 230 which connects to a LAN 170. A single device which connects to both a Local Area Network and a telephone line is commercially available from Megahertz and is known as the Ethernet-Modem.

The CPU or other microprocessor or circuitry executes a monitoring process to monitor the state of each of the sensors of the digital copier, and a sequencing process is used to execute the instructions of the code used to control and operate the digital copier. Additionally, there is a central system control process executed to control the overall operation of the digital copier and a communication process used to assure reliable communication to external devices connected to the digital copier. The system control process monitors and controls data storage in a static state memory such as the ROM 164 of FIG. 3, a semi-static memory such as the flash memory 178 or disk 182, or the dynamic state data which is stored in a volatile or non-volatile memory such as the RAM 162 or the flash memory or disk 182. Additionally, the static state data may be stored in a device other than the ROM 164 such as a non-volatile memory including either of the flash memory 178 or disk 182.

The above details have been described with respect to a digital copier but the present invention is equally applicable to other business office machines such as a facsimile machine, a scanner, a printer, a facsimile server, or other business office machines. Additionally, the present invention includes other types of machines which operate using a connection-mode or connectionless-mode of communication such as a metering system including a gas, water, or electricity metering system, vending machines, or any other device which performs mechanical operations, has a need to be monitored, performs a function, and operates based on user settings. In addition to monitoring special purpose machines, and computers, the invention can be used to monitor, control, and diagnose a general purpose computer.

Figure 5:
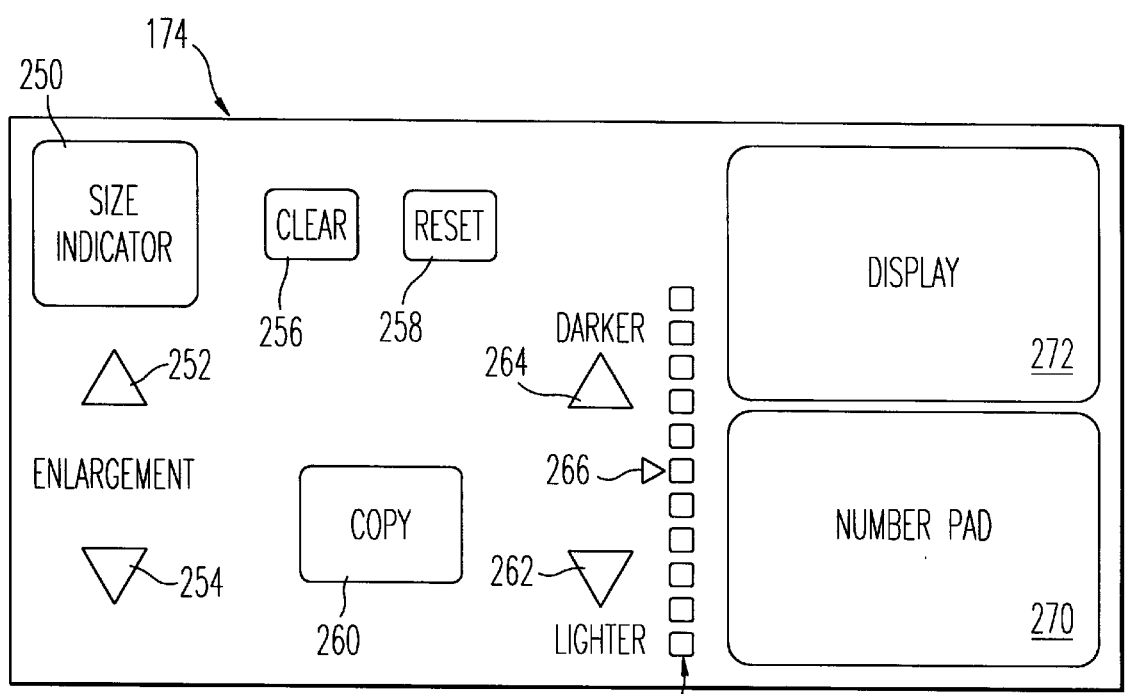
FIG. 5 illustrates an operation panel or user interface of a copier.

FIG. 5 illustrates the details of the operation panel 174 illustrated in FIG. 3. The operation panel 174 includes a size indicator 250 which is a display of how much the image generated by the copier is to be enlarged. For example, no enlargement would be indicated by a size of 100%, some enlargement would be a size of 110%, and a reduction in size would be indicated by 90%. An up button 252 increases the enlargement and a down button 254 reduces the size. There is a clear button 256 to clear a current copy operation, a reset button 258 to reset the parameters of the copier to default parameters, and a copy button or key 260 which commands the start of a copy job.

The print density of images generated by the copier is controlled by the lighter button 262 and a darker button 264. Each time one of these buttons is pressed, an indicator light such as one of the plurality of LEDs 268 moves one space in a direction corresponding to the key which was pressed. There is a mark 266 which indicates a default position or a value of 0 for the density. A convenient manner of referring to the print density is to assign the value of 0 to the default print density, +5 to the darkest print density, −5 to the lightest print density, and to use the values between −5 and +5 for the intermediate print densities. Alternatively, any desired way of representing the different print densities can be used.

The operation panel 174 further includes a display 272 which may be implemented as a Liquid Crystal Display (LCD), for example, and is used for displaying any type of information of the copier such as the parameters of the copier including the number of copies to be made, copying options, and diagnostic or error information of the copier including paper jams. The operation panel 174 further includes a number pad 270 which includes keys to enter any of the ten digits 0–9 in order to select a number of copies, for example.

Figure 6:
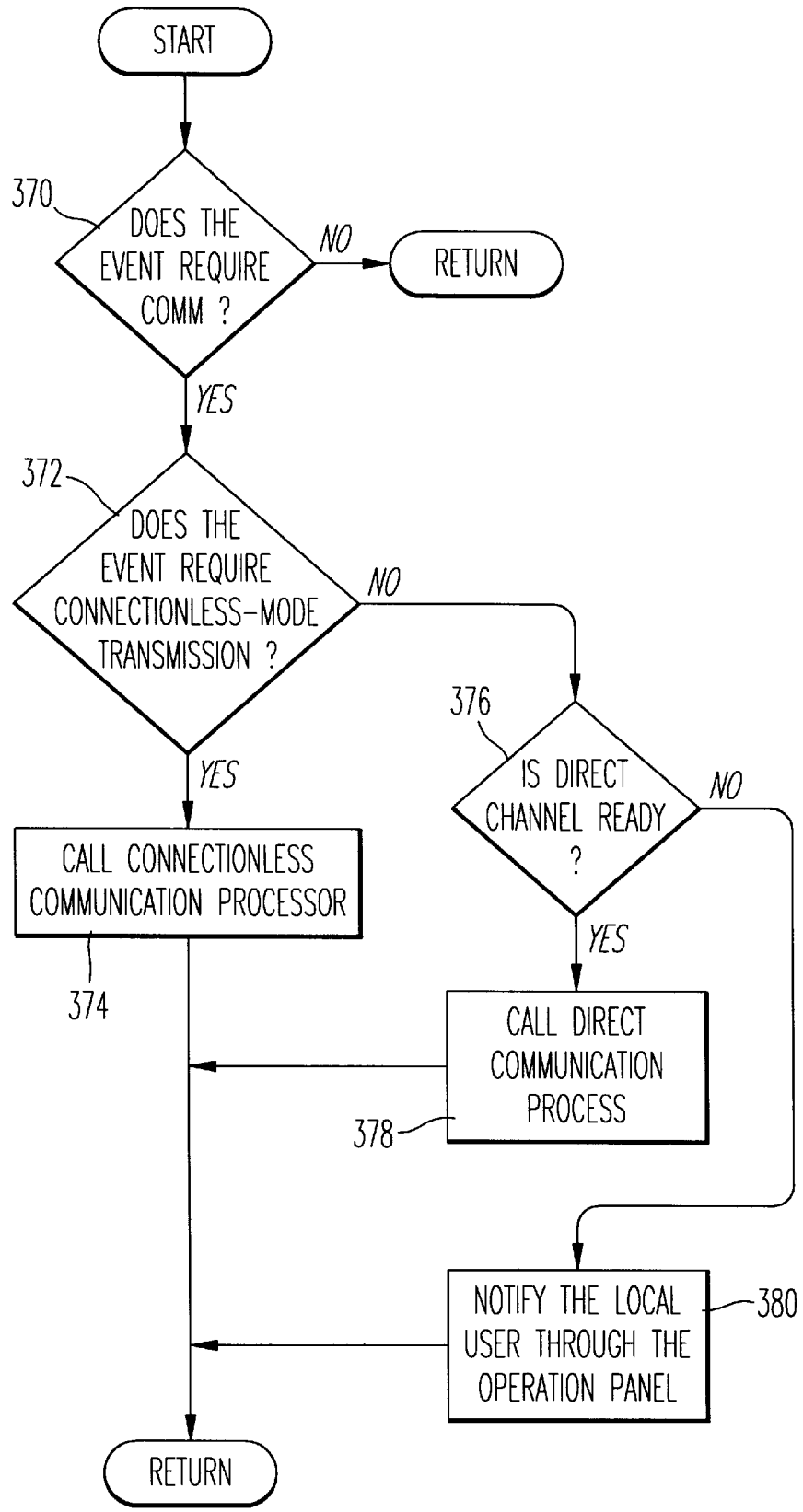
FIG. 6 is a flowchart illustrating the processing performed when communication is initiated by the machine.

FIG. 6 illustrates a process performed within the machine which determines whether a connection-mode or a connectionless-mode of communication is needed. After starting, step 370 determines if an event requires communication and if it does not, flow returns to the calling process. If communication is needed, step 372 determines whether the event requires a connectionless-mode or a connection-mode of transmission. Any type of high priority event for which immediate attention is needed or which the remote monitoring device would be interested in on an expedited basis is sent in a connection-mode of communication. This may be used when a hazardous condition exists within the machine or when something in the machine needs immediate attention. For example, if a thermistor in the fuser unit senses a high and unsafe temperature, a direct connection mode may be used. However, the transmission of a weekly or monthly report indicating the usage and a normal condition state in the machine can use the slower connectionless-mode of communication. The print density, unless extremely erroneous, is a routine non-critical function for which the connectionless-mode of communication can be used to indicate a problem. Additionally, when the connectionless mode of communication is not properly functioning, the connection-mode of communication is used. For example, if an Internet e-mail message is not properly received by the monitoring device, a direct connection-mode of communication is used. The e-mail message may contain a request for acknowledgment of receipt and if an acknowledgment is not received within a predetermined time (e.g. 3–24 hours) then a connection-mode communication is used to re-transmit the message. Also, if a connection-mode of communication is not properly functioning, then the connectionless-mode of communication may be used.

If step 372 determines that an event does not require a connectionless-mode of communication, step 376 determines if the direct communication channel is ready. For example, it determines if the telephone or ISDN line is available. If it is, a direct communication process is performed in step 378 to transmit the appropriate information. If the direct channel is not ready, step 380 notifies the user through the operation panel that there is a problem with the telephone, ISDN, or other direct connection device or communication medium. If step 372 determines that the event requires a connectionless-mode of transmission, step 374 calls a connectionless communication process. The process of FIG. 6 then returns to the calling process.

Figure 7:
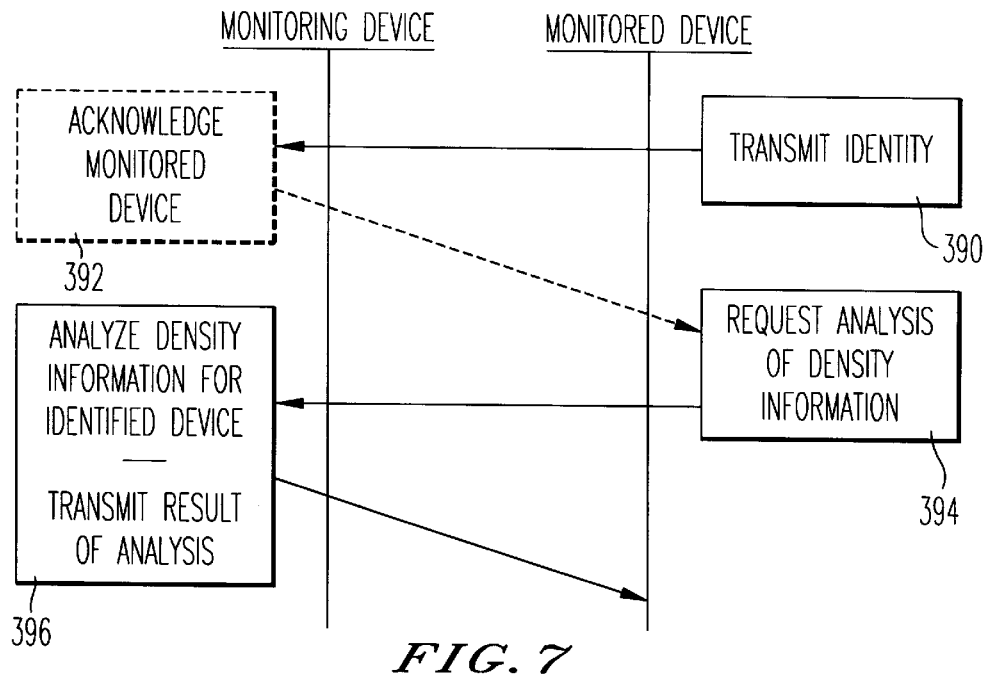
FIG. 7 illustrates connectionless communication from the machine to the remote monitoring device.

FIG. 7 illustrates a connectionless-mode of communication initiated by the machine which is being remotely diagnosed, controlled, and monitored. Initially, the monitored device transmits its identity in step 390. The monitored device then requests an analysis of the density information of the digital copier in step 394. The monitoring device analyzes the density information for the specific digital copier corresponding to the transmitted identity in order to determine if the print density of the digital copier is too dark or too light. Step 396 then transmits the results of the density analysis back to the monitored device. If the process of FIG. 7 used a connection-mode of communication, the monitoring device would execute step 392 which acknowledged receipt of the identity information and step 394 would not be performed until the acknowledgment was received. However, in a connectionless-mode of communication, step 392 is not performed and the transmission of the identity would be immediately followed by the request for analysis.

As with the business office machine, the remote device for controlling, diagnosing, and monitoring the machine may initiate either a connection-mode or connectionless-mode of communication. As with the machine, when the remote monitoring device needs to send urgent information or needs an urgent response from the machine, a connection-mode of communication is used. When time is not critical, the remote device may use a connectionless-mode of communication. For example, if new control software needs to be downloaded to the business office machine due to a bug in the program in the business office machine which causes a dangerous condition, a direct connection-mode of communication will be used. Also, as described with respect to the monitored device, if the monitoring device experiences a problem with one of the modes of communication, one of the other modes may be used.

Figure 8:
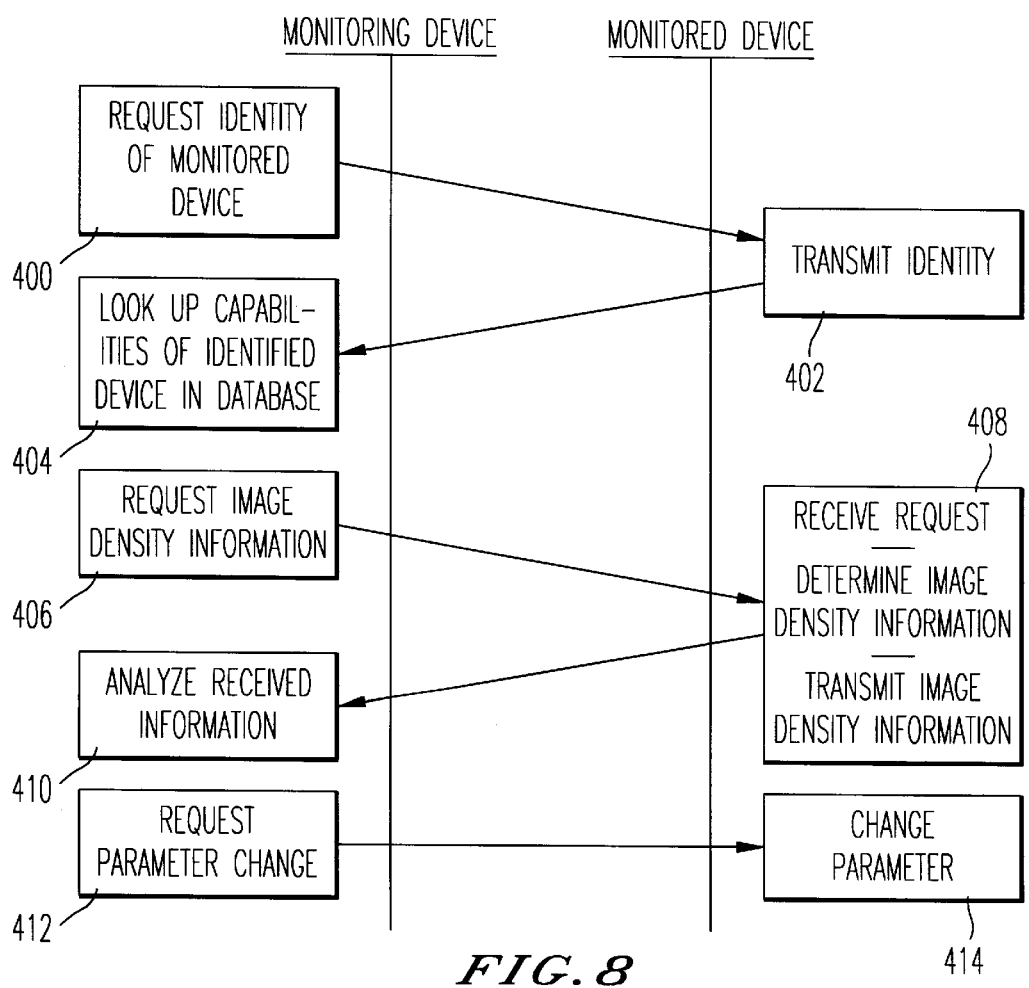
FIG. 8 illustrates a connection-mode of transmission between the monitoring device and the machine being monitored.

FIG. 8 illustrates a connection-mode of communication initiated by the monitoring device. Initially, step 400 requests the identity of the monitored device and the monitored device transmits its identity in step 402. In step 404, the monitoring device verifies the identity and looks up the capabilities of the identified device in a data base. The data base describes various information of the monitored device or machine such as service history, optional equipment, usage information, or other information. In step 406, the monitoring device requests image density information from the monitored device. In step 408, the monitored device receives the request for image density information, determines the image density information (or looks up previously stored image density information) and transmits the image density information back to the monitoring device in step 408. In step 410, the monitoring device analyzes the received information (i.e., compares the received information with information looked up in the data base) and determines that it is appropriate to change parameters of the monitored device. Step 412 requests parameters of the device to be changed and transmits an appropriate command. In step 414, the monitored device changes its operating parameters in accordance with the received command.

FIGS. 9A through 9C illustrate various data base structures which may be used by the invention. FIG. 9A illustrates a simple data base 440 containing the machine ID 442, the model number 444, the serial number 446, a command level 448, and an address 450. The ID 442 is a unique describer of the device and used to link various data bases describing the device such as the data bases illustrated in FIGS. 9B and 9C. The command level 448 indicates whether the machine can process simple or complex instruction sets. The address 450 contains the connection and connectionless address information including the network address, phone number, name, and any other information necessary to identify the machine.

Linked to the data base in FIG. 9A are the data bases in FIGS. 9B and 9C which respectively describe attachment information and the history of the machine. The data base structure 460 illustrated in FIG. 9B is for attachments and options for machines contained in the data base of FIG. 9A and contains an ID field 462 which corresponds to the ID field 442 of FIG. 9A. The attachment ID field 464 indicates the type of optional attachments connected to the machine such as a sorter, automatic document feeder, or other attachment. The attachment serial number 466 is the serial number of the attachment connected to the machine. The attachment ID field may be linked to a data base describing various features of the attachment data base. Other fields may be contained in the attachment and option data base 460.

The history of the machine is stored in a separate data base illustrated in FIG. 9C. The data base structure 470 again contains an ID field 472 which is used to link the various data bases. A date and time field 474 and an information field 476 is used to describe malfunctions or other special conditions and events within the machine including the date and time at which an event occurred.

The data bases as illustrated in FIGS. 9A–9C are illustrative of the type of information which is stored regarding the machine. Even though illustrated as separated data bases, the implementation of the data bases may include more or less data bases. Different departments within a company may maintain different data bases describing information about the various machines. The service data base will be most complete about individual machines, contain a complete service history of each machine, and may be stored at a customer service division. Separate manufacturing, engineering and marketing department data bases may be maintained and use the information generated from the machine.

The different data bases may be linked through different fields. For example, the service data base may be linked to the manufacturing data base through the serial and model numbers. The manufacturing data base and engineering data base may be linked through a version and model number, and the service data base and engineering data base may be linked through model numbers. Any type of known data base scheme may be used to maintain and share information, as needed.

Separate analysis and decision software may be created which allows a user to make a specific inquiry into any one or more of the data bases. The user may formulate any type of query and the data bases searched to produce the requested information. The analysis and decision software is also used to generate monthly or other regular reports describing information of the machines and may generate an alert or other type of warning when a malfunction occurs.

TABLE 1A

Monthly Report Message From Copiers

- Copy count and job count
- List of changed parts detected
- List of parameters changed
- Use of duplexing
- Use of reduction
- Use of enlargement
- Copy counts for various paper sizes
- Use of manual feed

TABLE 1B

Monthly Report Message From Printers

- Copy count and job count
- List of changed parts/supplies
- List of set up changes
- Use of duplexing if available
- Copy counts for various paper sizes
- Numbers of jobs for various printer languages such as PCL5 and PostScript
- Use of manual feed

TABLE 1C

Monthly Report Message From Facsimile Machines

- Number of transmissions and receptions
- Number of pages sent
- Number of pages received
- Counts for special features such as speed dials Tables 1A–1C illustrate monthly report messages which may be generated for copiers, printers, and facsimile machines. These monthly reports simply show the parameters, usage, and other information of the machines and of course may be different and include more or less information, as desired.

TABLE 2

Communication Commands

| Operator | Operands | T: Target, V: Value |
|---|---|---|
| Set | T V | |
| Get | T | |

TABLE 2-continued

Communication Commands

| Operator | Operands | T: Target, V: Value |
|---|---|---|
| Report | T V | |
| Set_List | $T_1\ V_1, T_2\ V_2, \ldots, T_n\ V_n$ | |
| Get_List | $T_1\ T_2, \ldots, T_n$ | |
| Report_List | $T_1\ V_1, T_2\ V_2, \ldots, T_n\ V_n$ | |
| Copy_Memory_To_Memory | Source Destination Num_Byte | |
| Copy_Memory_To_Disk | Source Name Num_Byte | |
| Copy_Disk_To_Memory | Name Destination | |
| Command_Not_Understood | Operator and Operands | |

Table 2 illustrates various communication commands which may be used to implement the communication operations described herein. The left-side of the table contains the operators and the right-side of the table contains the operands. In the table, T indicates a target which is a specific address, parameter, sensor, or stored data, and V is a value. The commands illustrated in Table 2 are the set command which allows a specific address, parameter, or stored data to be set to the value contained in V. Similarly, the get command allows specific target information to be obtained. The report operator is included in a report from the monitored machine of information requested by the get operator. The set_list, get_list and report_list allow more than one target and value to be obtained, set or generated using a single operator. The illustrated copy commands allow information to be copied from one memory address to another memory address, from a memory address to a disk, and from a disk to a memory location. The command_not understood operator indicates that a specific operator and/or operand(s) was not understood.

TABLE 3A

Commands to Copier

| | |
|---|---|
| get | id; |
| set | sorter yes; |
| set | adf     yes; |
| get | configuration; |
| get | A100; |
| set | A100    FFAA; |
| get | copy_count; |
| get | jam-count; |
| get | last_toner-change; |
| set | boot A100; |

TABLE 3B

Response from Copier

| | |
|---|---|
| report | id   AX301B3330; |
| report | configuration LIST (sorter yes, adf yes, large_capacity_tray no, , , ,); |
| report | A100    AABB; |
| report | A100    FFAA; |
| report | copy-count 9895; |
| report | jam-count 0; |
| report | last_toner_change   12Apr95; |

Table 3A illustrates commands which may be sent to a copier from a remote monitoring and diagnostic device (diagnostic service center) and Table 3B illustrates the response from the copier after receiving the commands of Table 3A. After the get id command in Table 3A, the response from the copier is a report of the id which is AX301B3330;. The second line of Table 3B illustrates the use of "LIST". In this case, the configuration includes more than one target parameter and therefore, the group of target parameters and their value are preceded by the "LIST" operator. The information in Tables 3A and 3B has been created for illustrative purposes. By setting the sorter and automatic document feeder (adf) in the second and third commands to the copier to be activated, no response from the copier is generated. In response to the get configuration command, there is a report generated from the copier in the second response from the copier. Also illustrated in Tables 3A and 3B are the getting and setting of a specific memory location A100. The last command in Table 3A is the setting of boot to A100. This means that upon rebooting or reinitialization of the copier, the memory location A100 is to be read.

Figure 10:
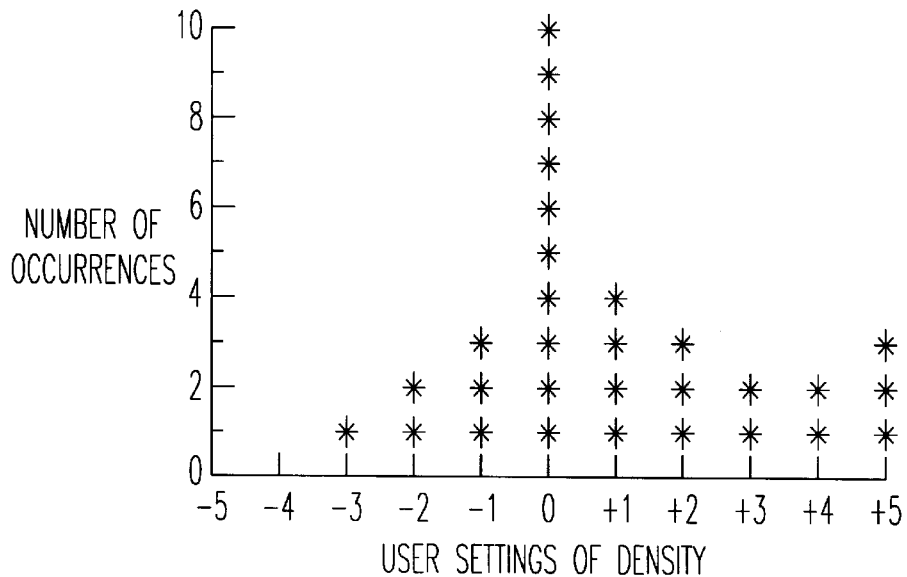
FIG. 10 is a histogram of the number of occurrences of the various user settings of image density for thirty copy jobs.

A feature of the diagnostics and analysis performed by the present invention is the analysis of user settings, general user interaction, or use of the business office device. A specific user setting which is monitored by the present invention is the user setting of the print density, although the invention applies to any user setting. As explained above with respect to the operation panel 174 illustrated in FIG. 5, a convenient way of representing the user setting of print density is to have zero as the default density, +5 as the darkest user selected print density, and −5 as the lightest user selected print density. FIG. 10 illustrates a histogram of the print density user setting for thirty print jobs which correspond to pressing the copy button 260 of the operation panel 174 thirty times. The histogram of FIG. 10 shows that the user setting of −3 occurred one time, −2 occurred two times, −1 occurred three times, 0 occurred ten times, +1 occurred four times, +2 occurred three times, +3 occurred two times, +4 occurred two times, and +5 occurred three times. It is seen in this histogram that for thirty print jobs, a darker density was chosen more times than a lighter print density. This would tend to indicate that generally, the default setting of 0 produces copies which are too light and the user would prefer a darker or more dense copy output. This feature of the invention of analyzing the user settings is directly based on what a user of the copier machines finds more desirable and is not solely based on what an electronic sensor would determine a user would find most preferable. However, the monitoring of the user settings of density can be used to identify that a problem exists which can then trigger any conventional manner of determining and adjusting print density.

While the present invention is primarily discussed with respect to the setting of the print density, other parameters set by the user or user behaviors can be used to determine the existence of a problem. For example, if users of the copier regularly select a magnification higher than 100% such as 105%, this could indicate that copies which are being generated using the default setting of 100% result in a printed image which is too small.

In order to determine that a problem exists with the user settings, some type of statistical analysis using the user settings can be performed. For example, the average and/or standard deviation of the user settings can be determined. In FIG. 10, the average user density setting is 0.967 and the standard deviation is 2.14. A density average, for example, above a predetermined threshold, such as 0.5 or 0.75 could be used to signal the occurrence that the default user density setting is too light.

The user settings should be analyzed over a series of copy jobs in order to have a statistically reasonable number of samples. If only one or a few copy jobs are used to analyze the user settings, a single user may skew the results and cause a signaling that the default value of the user density is not proper when it is actually acceptable. For example, a user copying the individual sheets which are very light using a darker print density setting could improperly signal a need for an adjustment of print density if only a few copy jobs were evaluated. Further, a single user may perform a large number of copy jobs in a short period of time and if the density setting by this user were to become the default density value, improper results could be obtained. Therefore, the preferred embodiment of the invention performs the statistical analysis over a predetermined period of time and for a predetermined number of copy jobs, although if desired, the decision can be based solely on the number of copy jobs or after any lapsed period of time. Additionally, too many copy jobs in a short time period may be discarded, if desired, as these copy jobs may all be by the same user who is making copies of very light originals, for example. If desired, only one copy job of every predetermined number of copy jobs will be sampled. A copy job is preferably defined to occur each time the copy button is pressed or a consecutive series of pages are copied or printed. Thus, if a 100 page document is placed into an automatic document feeder and one copy of each page is made at a print density setting which makes the resulting image darker, such a copy operation would count as one print job.

The preferred manner of storing the information of the user data is to store a summation of the user setting and the number of samples constituting the summation. A problem with the print density can be determined to exist when the absolute value of the summation or running total is greater than a value multiplied by the number of samples. Such an analysis is shown by the equation:

$$|\text{SUMMATION}| > \text{VALUE} * \text{NUMBER of JOBS} \qquad (1)$$

where Summation is the sum of the user settings for the Number of Jobs, the Value is a parameter such as 0.5 or 0.75 which indicates an average value above which there is probably a problem, and Number of Jobs indicates a number of copy or print jobs performed.

The above formula is effective at efficiently evaluating the user setting in that a multiplication, or equivalently a division, is only performed when it is necessary to do an analysis. Also, for each copy job when an analysis is not performed, the summation or running total is incremented by the appropriate value and the number of copy jobs is incremented by one. The above formula is simply evaluating the average value of the total user samples. For example, when the Value is 0.5, when the average of all user samples exceeds 0.5, there is an indication that the print density is incorrect. If the summation is a negative value, the printed copies are probably too dark and if the summation is a positive value, the default value of the printed copies is probably too light.

As an example, the user data indicated in FIG. 10 has a summation of 29 and a number of samples of 30. The average value of the user setting is 0.967 which is greater than 0.5, for example, which indicates that the default setting for the print density is probably too light. As indicated above, instead of using just the average value of the user setting, other statistical features such as the standard deviation can also be used in the analysis of the user settings.

The Summation and Number of Jobs can be stored in any desired memory location. Special registers may be utilized to store this information, if desired. Alternatively, conventional manners of storing information needed for determining the average and/or standard deviation can be used.

Further, the value of the user setting may be stored for each print job. This would require a memory location to store the user density of the most recent X print jobs, where X is the number of user settings which are to be stored. For example, if the last thirty user settings are stored, thirty memory locations are needed. After the thirty memory locations are each used, the next user setting may be stored in a memory location which contains the oldest data. A pointer may be used in a conventional manner to indicate which memory location contains the oldest data or alternatively, which memory location contains the newest data and the location of the newest data can be used to determine the oldest data which will be replaced by data from the next copy job, when all memory locations are full. In this manner, the memory locations are logically arranged in a circular manner such that the last memory location is linked to the first memory location and after the last memory location is used, the first memory location is subsequently used. This method can be extended to store the history of 30, for example, of the most recent jobs by storing additional information such as the number of copies.

Figure 11:
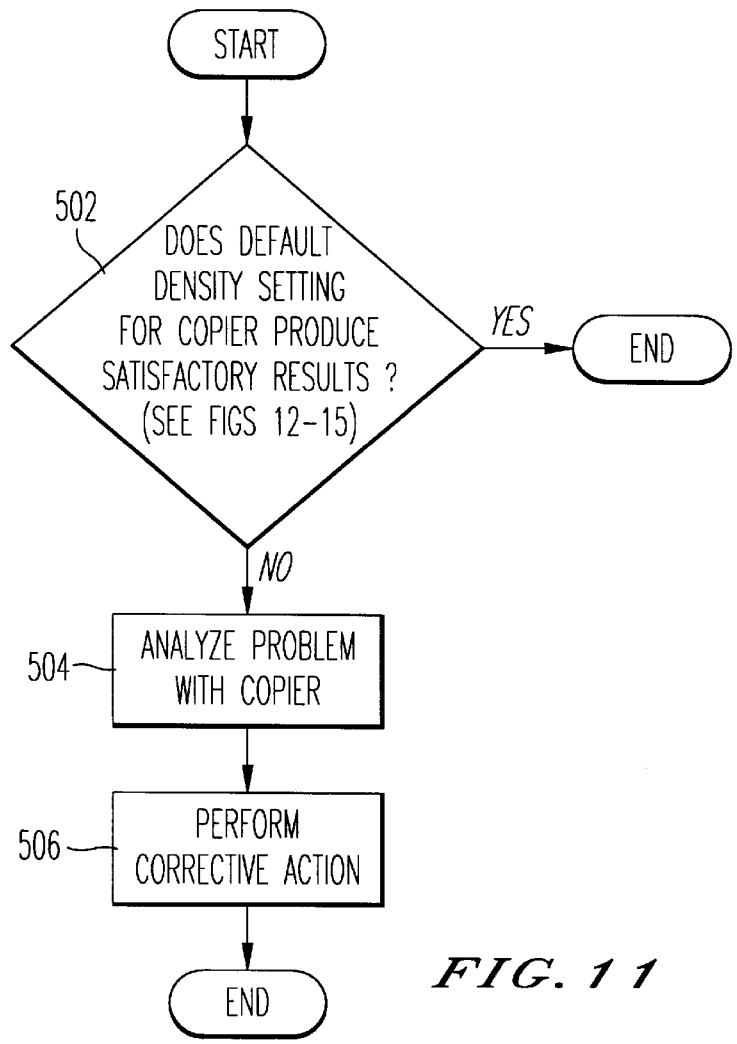
FIG. 11 is a flowchart illustrating a process used to analyze and correct the density of copier images based on whether the users alter the default density settings of the copier.

FIG. 11 illustrates a process of the invention for analyzing whether the default density settings are satisfactory. The process starts when the user presses the copy button 260. Alternatively, the process can be started at regular intervals, such as every five minutes, using a timer. After starting in FIG. 11, step 502 determines whether the default density setting for the copier produces satisfactory results. This step is preferably performed by analyzing, such as by statistical analysis, whether the user settings of density indicate that the default density produces results which are satisfactory to the user. The details of step 502 are explained below with respect to four embodiments illustrated in FIGS. 12–15. Step 502 operates to examine on a regular basis whether the default density setting is acceptable. If the density settings are acceptable, step 502 is performed again at a subsequent time or upon the occurrence of a subsequent print job. If the results are not satisfactory, the operation of the copier is analyzed in step 504. In step 504, the density is analyzed using a conventional process such as is disclosed in any of U.S. Pat. Nos. 5,475,476, 5,175,585, 5,333,037, or 5,317,368 for example. Alternatively, communication with a diagnostic service center is performed to analyze the operation of the copier as explained below with respect to FIG. 16. When a problem with the copier is determined to exist in step 504, corrective action is performed in step 506 which changes the default density based on the user settings of the previous jobs, a conventional density setting process, or alternatively, a service technician replaces the appropriate components which are defective such as the photoconductive drum, as described with respect to FIG. 16.

Figure 12:
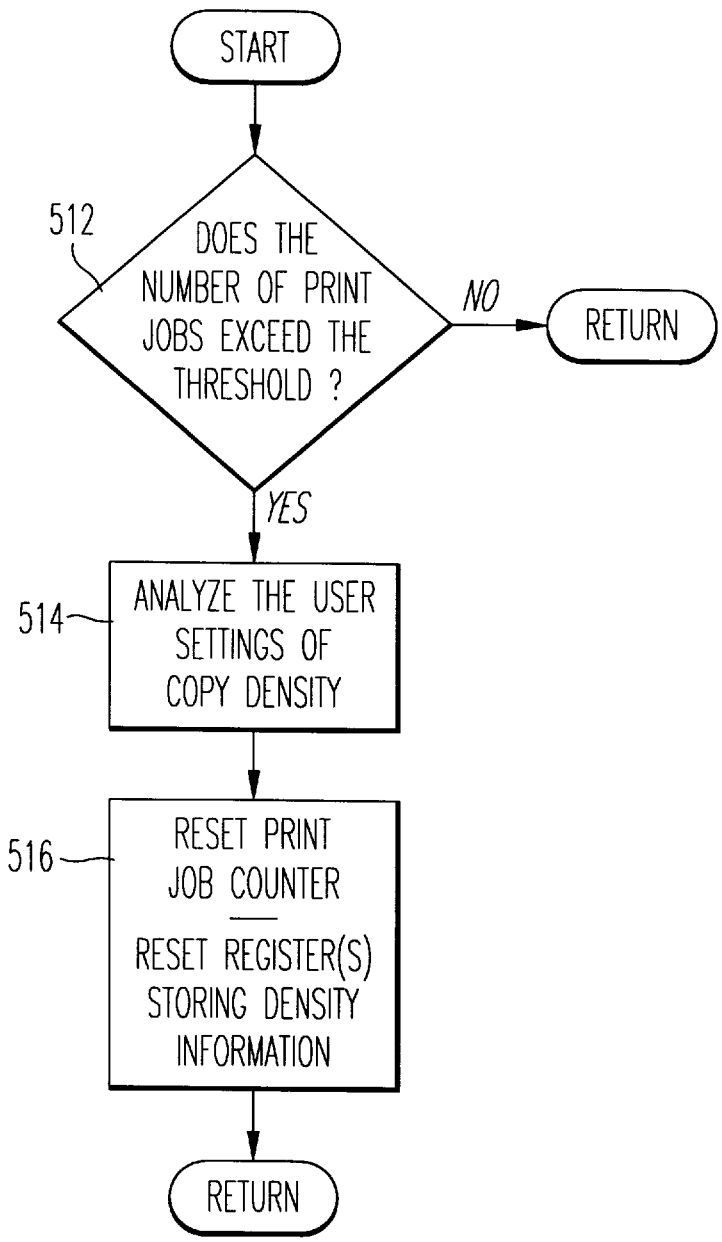
FIG. 12 is a flowchart of the process of determining if the default settings of the copier produce satisfactory results after a predetermined number of print jobs are performed.

FIG. 12 illustrates a process of determining whether the default density settings achieve satisfactory results in which the triggering of the analysis is performed based on the number of print jobs which have been performed since the last analysis. Alternatively, the number of print jobs which is analyzed in step 512 is based not solely on when the last analysis took place but based on data from a previous number of print jobs, the number of print jobs being equal to the threshold. The threshold is a minimum number of print jobs which are necessary to have been performed in order to trigger the analysis. The exact number of print jobs which are necessary to perform a proper analysis and can be set as desired. One possible number of print jobs which can be used for the threshold is thirty print jobs.

In FIG. 12, when step 512 determines that the number of print jobs exceeds the threshold, step 514 is performed which analyzes the user settings of the copier density. This analysis step is performed by determining the average in accordance with equation (1) described above, based on the standard deviation, a combination of the standard deviation and average, or using any desired method. When step 512 determines that the number of print jobs does not exceed the threshold, flow returns to FIG. 11 and step 502 results in a Yes return value and the process ends. In step 516, a counter which counts the number of print jobs is reset and the memory locations or register storing the user density information are reset. From step 516, flow proceeds to step 504 of FIG. 11.

Figure 13:
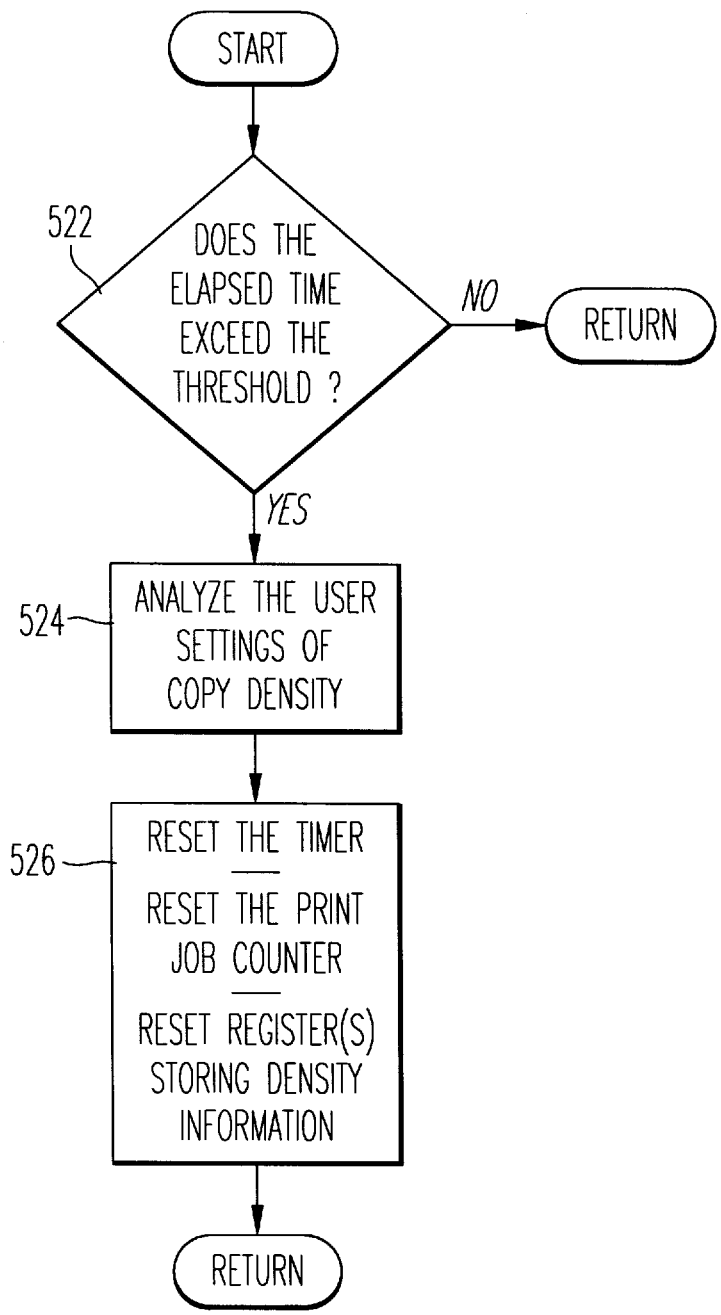
FIG. 13 is a flowchart of the process of determining if the default settings of the copier produce satisfactory results after a predetermined time period has passed.

FIG. 13 illustrates an embodiment in which the analysis is triggered after a predetermined amount of time expires. For example, the analysis may be performed every 60 minutes or one hour. Alternatively, a longer time such as two or three hours, a day or longer may be used. If step 522 determines that the elapsed time does not exceed the threshold, flow proceeds back to step 502 in FIG. 11 which results in a Yes return value and the process ends. If the elapsed time does exceed the threshold, flow proceeds to step 524 which operates in a similar manner as step 514 in order to analyze the user settings of the copy density and to determine the return value for step 502. Thereafter, step 526 resets the timer, resets the counter of the number of print jobs, and resets the memory locations storing the density information. After step 526, flow returns to FIG. 11 which continues with step 504 if the return value is No.

Figure 14:
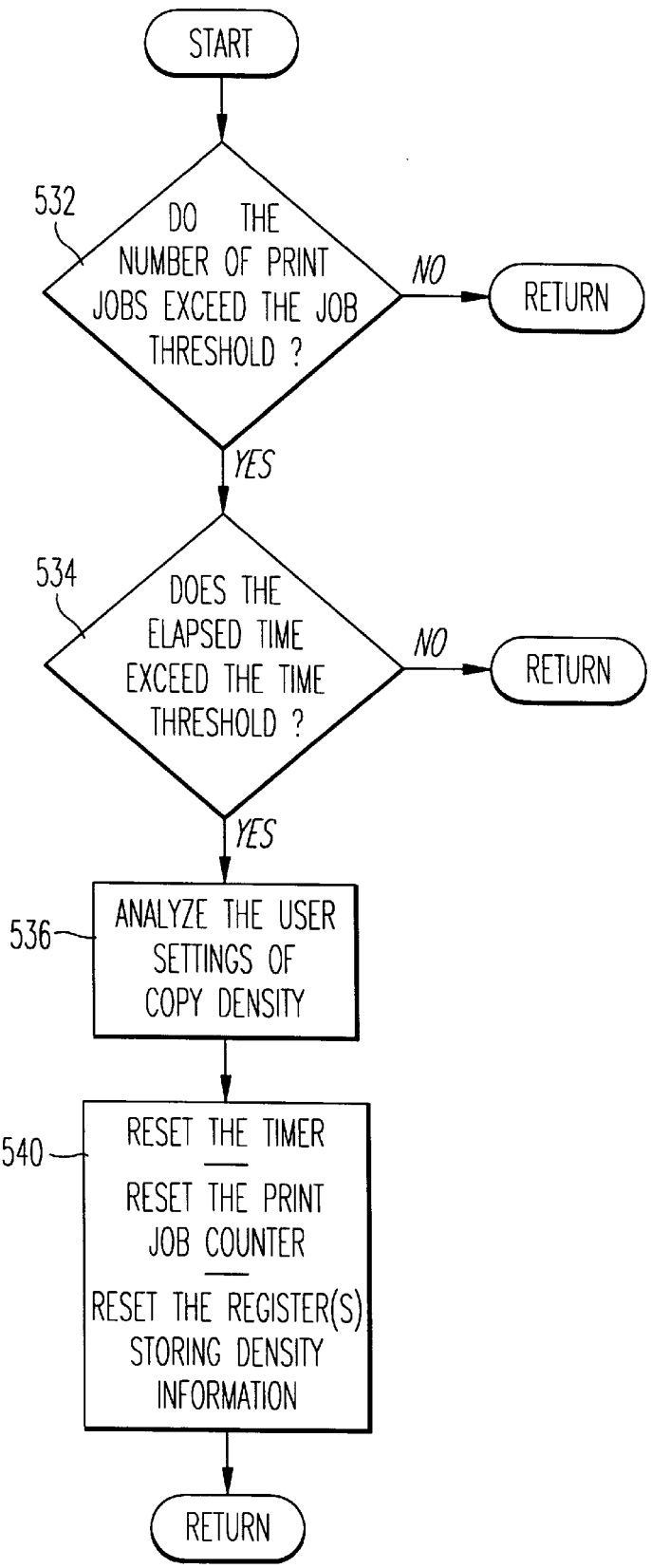
FIG. 14 is a flowchart of the process of determining if the default settings of the copier produce satisfactory results by an analysis of the user settings which is performed after a predetermined number of print jobs are performed and the expiration of a predetermined time period.

In the embodiment of FIG. 14, a combination of the number of print jobs and the elapsed time is used in order to trigger the analysis. After starting in FIG. 14, step 532 examines if the number of print jobs exceeds the job threshold such as thirty print jobs, for example. If it does not, flow returns to FIG. 11 where step 502 results in a Yes return value and the process ends. If the number of print jobs exceeds the threshold in FIG. 14, step 534 is performed which examines the elapsed time to determine if the time threshold is exceeded in a similar manner as step 522 of FIG. 13 is performed. If the time threshold is not exceeded in step 534, flow returns back to FIG. 11 where step 502 results in a Yes return value and the process ends. If the elapsed time exceeds the time threshold, step 536 is performed which performs an analysis similar to the analysis of steps 514 and 524 and determines the return value. Thereafter in step 540, the timer is reset, the print job counter is reset, and memory location(s) or register(s) storing the density information are reset. After step 540, flow returns to FIG. 11 and subsequently step 504 is performed if the return value is No.

Figure 15:
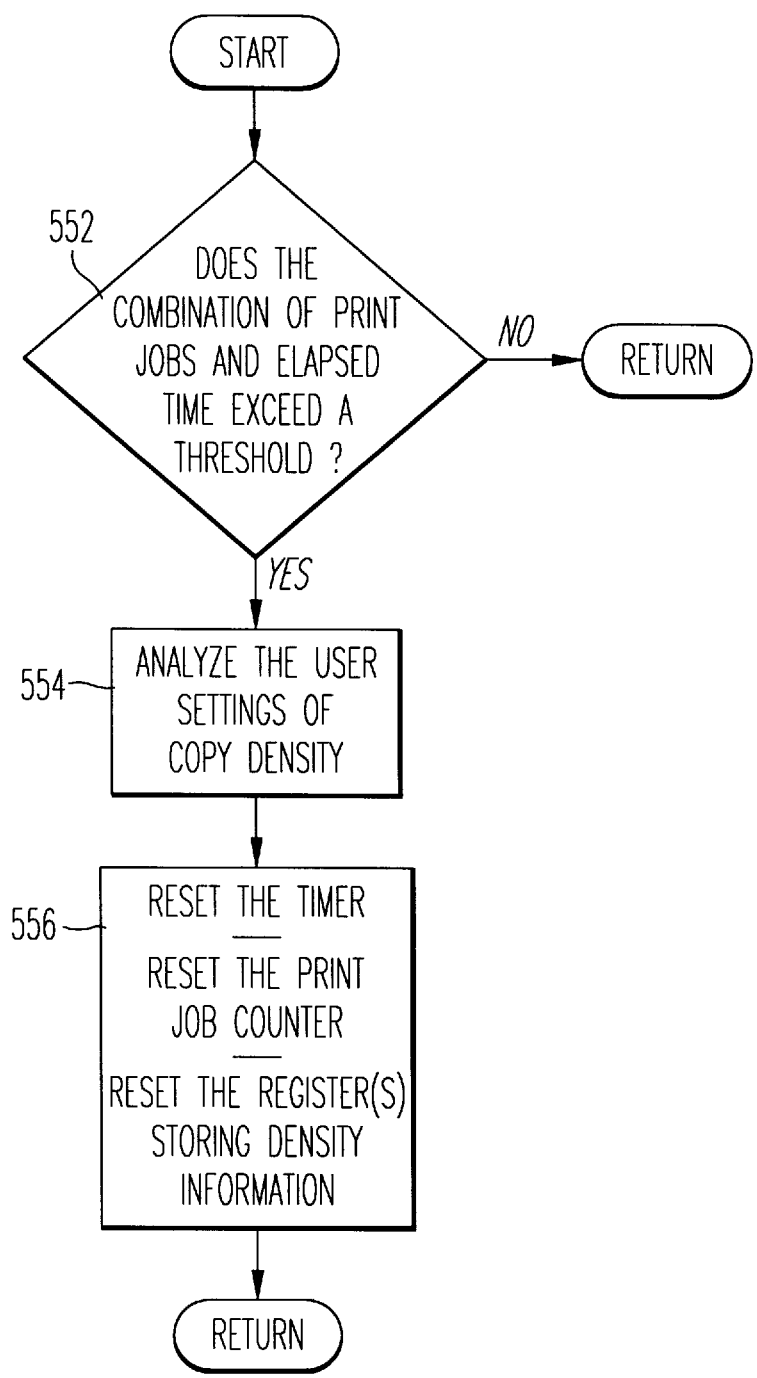
FIG. 15 illustrates a process for determining if the default settings of the user density are accurate in which an analysis is performed after a combination of print jobs and elapsed time exceeds a threshold.

FIG. 15 illustrates another embodiment of the invention in which the performing of the analysis of the user settings is triggered based on a combination of print jobs and the elapsed time. In this embodiment, the triggering is not performed based on one predetermined number of print jobs or one value for an elapsed time threshold but can have a number of combinations of the print jobs and elapsed times which trigger the threshold. For example, one combination could require thirty or more print jobs to occur in one hour or less, twenty or more print jobs to occur within one-half hour, or fifty or more print jobs to occur within three hours, for example. If the combination of print jobs and elapsed time does not exceed the threshold in step 522, flow returns to FIG. 11 which repeats steps 502 which results in a Yes return value and the process ends. If the combination does exceed the threshold in step 552, flow proceeds to steps 554 and 556 which operate in similar manners as steps 536 and 540 in FIG. 14. After step 556, flow returns to step 504 of FIG. 11 if the return value is No.

Figure 16:
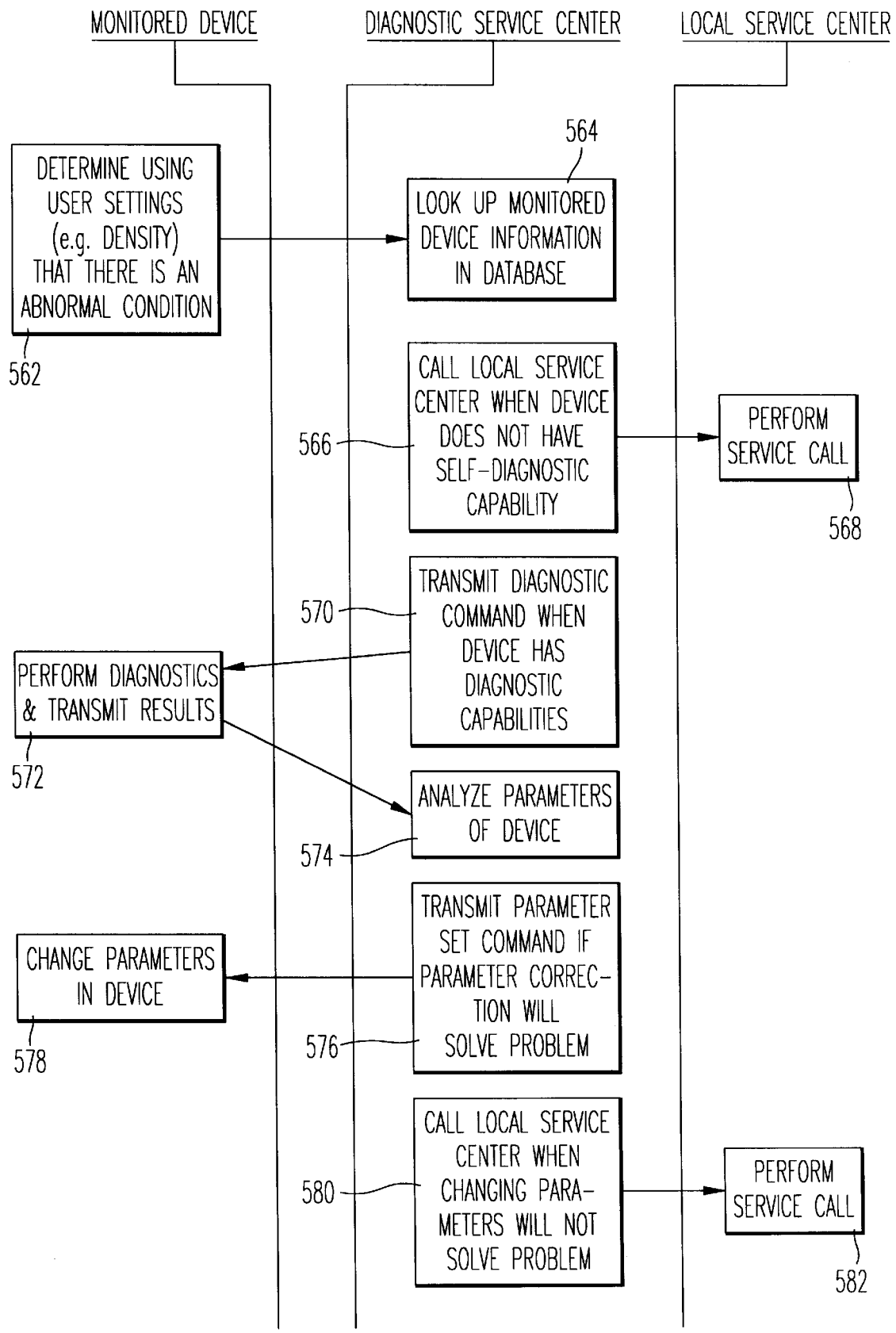
FIG. 16 illustrates communication performed between a monitored device and a diagnostic service center and also a local service center in accordance with the present invention.

FIG. 16 illustrates a process for communicating between the device which is being monitored such as the copier and a diagnostic service center. Initially, step 562 determines that there is an abnormal condition in the monitored device by analyzing the user settings. Such an abnormal condition might be the problem with print density. This determination corresponds to step 502 of FIG. 11, for example. In this embodiment, the indication of a problem is communicated to the diagnostic service center and in step 564, the diagnostic service center looks up information about the monitored device which is stored in a data base. However, instead of performing this communication, it is possible that the analysis and correction of the problem indicated by the user setting is performed solely within the monitored device. The communication which occurs is preferably performed by a connectionless-mode of communication such as by an Internet e-mail message, as explained above. Alternatively, any type of connection-mode communication can be utilized. It is to be noted that if the connectionless-mode of communication is not successful which is determined, for example, by the monitored device not receiving an acknowledgment from the diagnostic service center, the message can subsequently be transmitted to the diagnostic service center through a more reliable communication channel achieved by a connection-mode of communication.

After step 564 looks up information of the monitored device in the data base, an indication is given in step 566 that it is necessary to perform a service call in order to service the monitored device, when the device does not have self-diagnostic capability. This is accomplished by step 566 which, for example, calls a local service center and a local service representative travels to the monitored device in order to perform a service call in step 568.

As an alternative to calling the local service center in step 566, the diagnostic service center transmits a diagnostic command in step 570 when the monitored device has diagnostic capabilities. Subsequently, the monitored device performs diagnostics and transmits the results of the diagnostics in step 572 back to the diagnostic service center. In step 574, the diagnostic service center analyzes the parameters of the monitored device. If the problem in the monitored device can be corrected by changing the parameters within the monitored device, the diagnostic service center transmits a command to set the parameters within the monitored device in step 576 and the monitored device alters the parameters in step 578. When changing the parameters does not solve the problem which exists in the monitored device, step 580 calls a local service center so that the local service center performs a service call in step 582 in order to correct the problem occurring within the monitored device.

The communications occurring in FIG. 16 can each take place by a connectionless-mode of communication, a connection-mode of communication, or a combination of connectionless- and connection-modes of communication.

In addition to the machines accessing the Internet through a LAN, the machine can alternatively access the Internet through a telephone line or ISDN via an Internet access provider or a dial-up service such as America On Line. In this manner, a machine that is not connected to a network can still use a connectionless mode of connection. In this case, the machine will have to periodically dial the Internet provider in order to receive incoming Internet e-mail messages.

This invention may be conventionally implemented using a conventional general purpose digital computer programmed according to the teachings of the present invention, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuit, as will be readily apparent to those skilled in the art.

The present invention also includes a computer program product which is a storage medium including instructions which can be used to program a computer to perform a process of the invention. The storage medium can include, but is not limited to, any type of disk including floppy disks, optical disks, CD-ROMS, and magneto-optical disks, ROMs, RAMs, EPROMS, EEPROMs, magnetic or optical cards, or any type of media suitable for storing electronic instructions.

The above described system may used with conventional machines including conventional business office machines using add-on equipment constructed in accordance with the present teachings and installed in or outside of the machine. Further, an evaluation of the density of scanned images can be performed within a scanner in accordance with the teachings described herein.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for analyzing a business office device, comprising the steps of:

storing information of a user setting of the business office device;

evaluating said information of the user setting of the business office device, without evaluating information from sensors which indicate a sensed condition of the business office device, to determine if there is an abnormal condition in the business office device; and performing an act at the business office device in response to the evaluating step determining that there is an abnormal condition in the business office device.

2. A method according to claim 1, further comprising the step of:

commanding, a plurality of times, the business office machine to operate, wherein the storing step comprises:

storing the information of the user setting each time the business office device is commanded to operate, and the evaluating step comprises evaluating the information of the stored user settings of the business office device to determine if there is the abnormal condition in the business office device.

3. A method according to claim 2, wherein:

the evaluating step is performed after a predetermined number of commands to operate the business office device are issued.

4. A method according to claim 2, wherein:

the evaluating step is performed after a predetermined time period elapses.

5. A method according to claim 2, wherein:

the evaluating step is performed after a predetermined number of commands to operate the business office device are issued and after a predetermined time period elapses.

6. A method according to claim 2, wherein:

the evaluating step is performed after a predetermined number of commands to operate the business office device are issued and after a predetermined time period elapses, the predetermined number of commands being selected based on a duration of the predetermined time period.

7. A method according to claim 2, wherein the step of performing an act comprises:

performing a diagnostic operation within the business office device which changes an operating parameter of a part of the business office device which operates in accordance with said user setting.

8. A method according to claim 7, further comprising the step of:

contacting, by the business office device, a remote diagnostic center and indicating that there is a problem with the business office device, when the step of performing a diagnostic operation is not capable of changing the parameter so that the business office device will operate properly.

9. A method according to claim 8, wherein the contacting step comprises:

contacting, by the business office device, the remote diagnostic center through an Internet connection including a firewall device.

10. A method according to claim 2, wherein the step of performing an act at the business office device comprises:

contacting, by the business office device, a diagnostic service center and indicating that there is a problem with the business office device.

11. A method according to claim 10, wherein the step of contacting comprises:

transmitting a connectionless-mode message from the business office device to a diagnostic service center indicating that there is the problem with the business office device.

12. A method according to claim 11, wherein the step of contacting comprises:

transmitting the connectionless-mode message as an Internet electronic mail message.

13. A method according to claim 12, further comprising the step of:

transmitting a connection-mode message from the business office device to the diagnostic service center, when an acknowledgment of the connectionless-mode message is not received by the business office device from the diagnostic service center.

14. A method according to claim 13, wherein:

the step of transmitting the connection-mode message comprises:

placing a telephone call from the business office device to the diagnostic service center.

15. A method according to claim 13, wherein the step of transmitting the connection-mode message comprises:

transmitting the connection-mode message through an Internet connection including a firewall device.

16. A method according to claim 10, further comprising the step of:

referencing information of the business office device in a database at the diagnostic center.

17. A method according to claim 16, further comprising the step of:

indicating, by the diagnostic service center, that a service call for the business office device is needed.

18. A method according to claim 17, wherein:

the indicating step is performed when the business office device does not have capabilities to perform a self-diagnosis.

19. A method according to claim 17, wherein:

the indicating step is performed when the abnormal condition cannot be corrected by changing a parameter in the business office device.

20. A method according to claim 2, wherein the step of evaluating the user settings comprises:

evaluating the user settings of print density.

21. A method according to claim 1, further comprising the step of, performed after said step of evaluating user settings is performed and an abnormal condition is sensed:

automatically communicating with a remote diagnostic service center before making an initial attempt to correct the abnormal condition of the business office device.

22. A method for analyzing a business office device, comprising the steps of:

storing information of a user setting of the business office device;

evaluating the user setting of the business office device to determine if there is an abnormal condition in the business office device; and communicating from the business office device to a diagnostic service center using an electronic mail message transmitted over an Internet connection in response to the evaluating step determining that there is an abnormal condition in the business office device.

23. A method according to claim 22, wherein the step of communicating comprises:

transmitting the electronic mail message through a firewall device connected to the Internet.

24. A system for analyzing a business office device, comprising:

means for storing information of a user setting of the business office device;

means for evaluating said information of the user setting of the business office device, without evaluating information from sensors which indicate a sensed condition of the business office device, to determine if there is an abnormal condition in the business office device; and means for performing an act at the business office device in response to the means for evaluating determining that there is an abnormal condition in the business office device.

25. A system according to claim 24, further comprising:

means for commanding, a plurality of times, the business office device to operate, wherein the means for storing comprises:

means for storing the information of the user setting each time the business office device is commanded to operate, and the means for evaluating comprises means for evaluating the information of the stored user settings of the business office device to determine if there is the abnormal condition in the business office device.

26. A system according to claim 25, wherein:

the means for evaluating operates after a predetermined number of commands to operate the business office device are issued.

27. A system according to claim 25, wherein:

the means for evaluating operates after a predetermined time period elapses.

28. A system according to claim 25, wherein:

the means for evaluating operates after a predetermined number of commands to operate the business office device are issued and after a predetermined time period elapses.

29. A system according to claim 25, wherein:

the means for evaluating operates after a predetermined number of commands to operate the business office device are issued and after a predetermined time period elapses, the predetermined number of commands being selected based on a duration of the predetermined time period.

30. A system according to claim 25, wherein the means for performing an act, comprises:

means for performing a diagnostic operation within the business office device which changes an operating parameter of a part of the business office device which operates in accordance with said user setting.

31. A system according to claim 30, further comprising:

means for contacting, by the business office device, a remote diagnostic center and indicating that there is a problem with the business office device, when the means for performing a diagnostic operation is not capable of changing the parameter so that the business office device will operate properly.

32. A system according to claim 31, wherein the means for contacting comprises:

means for contacting, by the business office device, the remote diagnostic center through an Internet connection including a firewall device.

33. A system according to claim 25, wherein the means for performing an act at the business office device, comprises:

means for contacting, by the business office device, a diagnostic service center and indicating that there is a problem with the business office device.

34. A system according to claim 33, wherein the means for contacting comprises:

means for transmitting a connectionless-mode message from the business office device to a diagnostic service center indicating that there is the problem with the business office device.

35. A system according to claim 34, wherein the means for contacting comprises:

means for transmitting the connectionless-mode message as an Internet electronic mail message.

36. A system according to claim 35, further comprising:

means for transmitting a connection-mode message from the business office device to the diagnostic service center, when an acknowledgment of the connectionless-mode message is not received by the business office device from the diagnostic service center.

37. A system according to claim 36, wherein:

the means for transmitting the connection-mode message comprises:

means for placing a telephone call from the business office device to the diagnostic service center.

38. A system according to claim 36, wherein the means for transmitting the connection-mode message comprises:

means for transmitting the connection-mode message through an Internet connection including a firewall device.

39. A system according to claim 33, further comprising:

means for referencing information of the business office device in a database at the diagnostic service center.

40. A system according to claim 39, further comprising:

means for indicating, by the diagnostic service center, that a service call for the business office device is needed.

41. A system according to claim 40, wherein:

the means for indicating operates when the business office device does not have capabilities to perform a self-diagnosis.

42. A system according to claim 40, wherein:

the means for indicating operates when the abnormal condition cannot be corrected by changing a parameter in the business office device.

43. A system according to claim 25, wherein the means for evaluating the user settings comprises:

means for evaluating the user settings of print density.

44. A system according to claim 24, further comprising:

means for automatically communicating with a remote diagnostic service center before making an initial attempt to correct the abnormal condition of the business office device, after said means for evaluating detects that an abnormal condition exists.

45. A system for analyzing a business office device, comprising:

means for storing information of a user setting of the business office device;

means for evaluating the user setting of the business office device to determine if there is an abnormal condition in the business office device; and means for communicating from the business office device to a diagnostic service center using an electronic mail message transmitted over an Internet connection in response to the means for evaluating determining that there is an abnormal condition in the business office device.

46. A system according to claim 45, wherein the means for communicating comprises:

means for transmitting the electronic mail message through a firewall device connected to the Internet.

47. A method for analyzing a business office device, comprising the steps of:

storing information of a user setting of the business office device;

evaluating the user setting of the business office device to determine if there is an abnormal condition in the business office device; and performing an act at the business office device in response to the evaluating step determining that there is an abnormal condition in the business office device, the method further comprising the step of:

commanding, a plurality of times, the business office machine to operate, wherein the storing step comprises:

storing the information of the user setting each time the business office device is commanded to operate, and the evaluating step comprises evaluating the information of the stored user settings of the business office device to determine if there is the abnormal condition in the business office device, wherein the evaluating step is performed after a predetermined number of commands to operate the business office device are issued and after a predetermined time period elapses.

48. A method according to claim 47, wherein:

said predetermined number of commands are selected based on a duration of the predetermined time period.

49. A system for analyzing a business office device, comprising:
  means for storing information of a user setting of the business office device;
  means for evaluating the user setting of the business office device to determine if there is an abnormal condition in the business office device; and
  means for performing an act at the business office device in response to the means for evaluating determining that there is an abnormal condition in the business office device,
  the system further comprising:
    means for commanding, a plurality of times, the business office machine to operate,
  wherein the means for storing comprises:
    means for storing the information of the user setting each time the business office device is commanded to operate, and
    the means for evaluating comprises means for evaluating the information of the stored user settings of the business office device to determine if there is the abnormal condition in the business office device,
    wherein the means for evaluating operates after a predetermined number of commands to operate the business office device are issued and after a predetermined time period elapses.

50. A method according to claim 49, wherein:
  said predetermined number of commands are selected based on a duration of the predetermined time period.

51. A method for analyzing a business office device, comprising the steps of:
  storing information of a user setting of the business office device;
  evaluating the user setting of the business office device to determine if there is an abnormal condition in the business office device; and
  performing an act at the business office device in response to the evaluating step determining that there is an abnormal condition in the business office device,
  the method further comprising the step of:
    commanding, a plurality of times, the business office machine to operate,
  wherein the storing step comprises:
    storing the information of the user setting each time the business office device is commanded to operate, and
    the evaluating step comprises evaluating the information of the stored user settings of the business office device to determine if there is the abnormal condition in the business office device,
  wherein the step of performing an act at the business office device comprises:
    contacting, by the business office device, a diagnostic service center and indicating that there is a problem with the business office device, and
  wherein the step of contacting comprises:
    transmitting a connectionless-mode message from the business office device to a diagnostic service center indicating that there is the problem with the business office device.

52. A method according to claim 51, wherein the step of contacting comprises:
  transmitting the connectionless-mode message as an Internet electronic mail message.

53. A method according to claim 52, further comprising the step of:
  transmitting a connection-mode message from the business office device to the diagnostic service center, when an acknowledgment of the connectionless-mode message is not received by the business office device from the diagnostic service center.

54. A method according to claim 53, wherein:
  the step of transmitting the connection-mode message comprises:
    placing a telephone call from the business office device to the diagnostic service center.

55. A method according to claim 53, wherein the step of transmitting the connection-mode message comprises:
  transmitting the connection mode message through an Internet connection including a firewall device.

56. A method for analyzing a business office device, comprising the steps of:
  storing information of a user setting of the business office device;
  evaluating the user setting of the business office device to determine if there is an abnormal condition in the business office device; and
  performing an act at the business office device in response to the evaluating step determining that there is an abnormal condition in the business office device,
  the method further comprising the step of:
    commanding, a plurality of times, the business office machine to operate,
  wherein the storing step comprises:
    storing the information of the user setting each time the business office device is commanded to operate, and
    the evaluating step comprises evaluating the information of the stored user settings of the business office device to determine if there is the abnormal condition in the business office device,
  wherein the step of performing an act at the business office device comprises:
    contacting, by the business office device, a diagnostic service center and indicating that there is a problem with the business office device,
  the method further comprising the step of:
    referencing information of the business office device in a database at the diagnostic center.

57. A method according to claim 56, further comprising the step of:
  indicating, by the diagnostic service center, that a service call for the business office device is needed.

58. A method according to claim 57, wherein:
  the indicating step is performed when the business office device does not have capabilities to perform a self-diagnosis.

59. A method according to claim 57, wherein:
  the indicating step is performed when the abnormal condition cannot be corrected by changing a parameter in the business office device.

60. A system for analyzing a business office device, comprising:
  means for storing information of a user setting of the business office device;
  means for evaluating the user setting of the business office device to determine if there is an abnormal condition in the business office device; and
  means for performing an act at the business office device in response to the means for evaluating determining that there is an abnormal condition in the business office device, the system further comprising:
means for commanding, a plurality of times, the business office machine to operate,
wherein the means for storing comprises:
means for storing the information of the user setting each time the business office device is commanded to operate, and
the means for evaluating comprises means for evaluating the information of the stored user settings of the business office device to determine if there is the abnormal condition in the business office device,
wherein the means for performing an act at the business office device comprises:
means for contacting, by the business office device, a diagnostic service center and indicating that there is a problem with the business office device,
wherein the means for contacting comprises:
means for transmitting a connectionless-mode message from the business office device to a diagnostic service center indicating that there is the problem with the business office device.

61. A system according to claim 60, wherein the means for contacting comprises:
means for transmitting the connectionless-mode message as an Internet electronic mail message.

62. A system according to claim 61, further comprising:
means for transmitting a connection-mode message from the business office device to the diagnostic service center, when an acknowledgment of the connectionless-mode message is not received by the business office device from the diagnostic service center.

63. A system according to claim 62, wherein:
the means for transmitting the connection-mode message comprises:
means for placing a telephone call from the business office device to the diagnostic service center.

64. A system according to claim 62, wherein the means for transmitting the connection-mode message comprises:
means for transmitting the connection mode message through an Internet connection including a firewall device.

65. A system for analyzing a business office device, comprising:
means for storing information of a user setting of the business office device;
means for evaluating the user setting of the business office device to determine if there is an abnormal condition in the business office device; and
means for performing an act at the business office device in response to the means for evaluating determining that there is an abnormal condition in the business office device,
the system further comprising:
means for commanding, a plurality of times, the business office machine to operate,
wherein the means for storing comprises:
means for storing the information of the user setting each time the business office device is commanded to operate, and
the means for evaluating comprises means for evaluating the information of the stored user settings of the business office device to determine if there is the abnormal condition in the business office device,
wherein the means for performing an act at the business office device comprises:
means for contacting, by the business office device, a diagnostic service center and indicating that there is a problem with the business office device,
the system further comprising:
means for referencing information of the business office device in a database at the diagnostic center.

66. A system according to claim 65, further comprising:
means for indicating, by the diagnostic service center, that a service call for the business office device is needed.

67. A system according to claim 66, wherein:
the means for indicating operates when the business office device does not have capabilities to perform a self-diagnosis.

68. A system according to claim 66, wherein:
the means for indicating operates when the abnormal condition cannot be corrected by changing a parameter in the business office device.

* * * * *

UNITED STATES PATENT AND TRADEMARK OFFICE
CERTIFICATE OF CORRECTION

PATENT NO. : 5,887,216

DATED : March 23, 1999

INVENTOR(S): Tetsuro MOTOYAMA

It is certified that an error appears in the above-identified patent and that said Letters Patent is hereby corrected as shown below:

On the title page, item [54] and col. 1, line 1, should read as following:

METHOD AND SYSTEM TO DIAGNOSE A BUSINESS OFFICE DEVICE BASED ON OPERATING PARAMETERS SET BY A USER--

Signed and Sealed this

Seventh Day of March, 2000

*Attest:*

*Attesting Officer*

Q. TODD DICKINSON

*Commissioner of Patents and Trademarks*